United States Patent [19]

Oliver et al.

[11] Patent Number: 5,231,616
[45] Date of Patent: Jul. 27, 1993

[54] CALIBRATION OF A CARTRIDGE HANDLING DEVICE USING MECHANICAL SENSE OF TOUCH

[75] Inventors: Thomas C. Oliver; Mark J. Bianchi; Mark E. Wanger; Donald J. Stavely, all of Fort Collins; Kraig A. Proehl, Loveland, all of Colo.

[73] Assignee: Hewlett-Packard Company, Palo Alto, Calif.

[21] Appl. No.: 878,793

[22] Filed: May 5, 1992

Related U.S. Application Data

[63] Continuation of Ser. No. 334,665, Apr. 6, 1989, Pat. No. 5,134,600.

[51] Int. Cl.[5] .................. G05B 11/26; G05B 17/22
[52] U.S. Cl. ................................ 369/34; 369/36; 318/561
[58] Field of Search .................. 318/560–630; 369/34, 38, 36, 77.1, 77.2, 195, 30, 39; 360/92, 98.05, 98.06, 72, 99.06, 92, 99.02; 414/277, 730, 280, 731, 281, 732, 417, 757; 901/3, 6, 9; 395/80–99

[56] References Cited

U.S. PATENT DOCUMENTS

| | | | |
|---|---|---|---|
| 4,278,920 | 7/1981 | Ruoff, Jr. ..................... | 318/568 X |
| 4,608,679 | 8/1986 | Rudy et al. .................. | 369/36 |
| 4,621,332 | 11/1986 | Sugimoto et al. ............ | 318/568 X |
| 4,675,856 | 6/1987 | Rudy et al. .................. | 369/36 |
| 4,685,095 | 8/1987 | Rudy et al. .................. | 369/36 |
| 4,788,482 | 11/1988 | Tachibana et al. .......... | 318/616 |
| 4,881,161 | 11/1989 | Thompson .................. | 318/671 X |
| 4,925,312 | 5/1990 | Onaga et al. ................ | 318/568.22 X |
| 5,001,582 | 3/1991 | Numasaki .................... | 360/98.06 |
| 5,040,159 | 8/1991 | Oliver et al. ................ | 369/34 |
| 5,057,758 | 10/1991 | Oliver et al. ................ | 318/603 |

Primary Examiner—Paul Ip

[57] ABSTRACT

Disclosed is an optical disk handling system having two control systems to provide the motions necessary to move optical disk cartridges form storage holding cells to an optical drive. During initialization, the cartridge handling system uses shaft encoders, along with current or voltage feedback from the motors, to calibrate the home locations of the mechanisms. The system determines the home position for vertical movement of the transport as well as the top and bottom positions used for the translate operation. The system then calibrates the plunge movement, the flip movement, and the translate movement. Finally, the system determines whether the path for all the movements is free of obstructions.

1 Claim, 26 Drawing Sheets

CALIBRATION OF A CARTRIDGE HANDLING DEVICE USING MECHANICAL SENSE OF TOUCH

CROSS REFERENCE TO RELATED APPLICATIONS

This application is a continuation of Application Ser. No. 07/334,665, filed Apr. 6, 1989, of Oliver, Bianchi, Wanger, Stavely, and Proehl, entitled "Calibration of a Cartridge Handling Device Using Mechanical Sense of Touch".

BACKGROUND OF THE INVENTION

This invention relates to computer systems and more particularly to an apparatus for handling and storing optical disk cartridges. Even more particularly this invention relates to calibrating the positions of moving mechanisms within such apparatus.

An optical disk is a data storage medium which is readable by a laser-based reading device. Optical disks known as "compact disks" or "CDs" have become increasingly popular during the past few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally mounted in cartridges, and the reading devices generally read or write data through a slot provided on a surface of the cartridge. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging a disk, moving it vertically, laterally, and longitudinally and then releasing it in order to remove it from storage, move it into aligned relationship with the disk reader, and insert it into the disk reader. It may further be necessary for the disk handling system to flip the disk to reverse the side thereof which will be positioned in readable relationship with a reader. It may also be necessary to reorient a disk at the time it is initially inserted into the system by an operator.

In order to decrease production and maintenance costs and to increase reliability of such a disk handling system, it is generally desirable to reduce the number of separate control systems to a minimum. It is also desirable to minimize the use of sensing devices which are particularly subject to malfunction such as, for example, photoelectric or magnetic proximity sensors. It is also desirable to minimize the mounting of sensors or motors on moving system components to eliminate problems associated with moving lead wires, etc.

There is need in the art then for a system that detects the location of its mechanisms using a minimum number of sensors. There is a further need for such a system that performs such detection using sensors that are not mounted on moving mechanisms. Still another need is for a system to calibrate the initial location o its mechanisms by monitoring the force being exerted by such mechanism. A still further need is for a system that detects obstructions without a separate sensor for such detection.

Various features and components of such a cartridge handling system are disclosed in the following U.S. patent applications:

(A) Ser. No. 278,102 filed Nov. 30, 1988 for OPTICAL DISK HANDLING APPARATUS WITH FLIP LATCH of Methlie, Oliver, Stavely and Wanger, now U.S. Pat. No. 4,998,232.

(B) Ser. No. 288,608 filed Dec. 22, 1988 for OPTICAL DISK INSERTION APPARATUS OF Christie, Wanger, Dauner, Jones and Domel, now U.S. Pat. No. 5,062,093;

(C) Ser. No. 289,388 filed Jan. 18, 1989 for LATERAL DISPLACEMENT CONTROL ASSEMBLY FOR AN OPTICAL DISK HANDLING SYSTEM of Wanger, Methlie, Stavely and Oliver, now U.S. Pat. No. 5,101,387; and (D) Ser. No. 305,898 filed Feb. 2, 1989 for OPTICAL DISK CARTRIDGE HANDLING APPARATUS WITH PASSIVE CARTRIDGE ENGAGEMENT ASSEMBLY of Wanger, Methlie, Jones and Stavely, now U.S. Pat. No. 5,014,255;

(E) Ser. No. 314,012 filed Feb. 22, 1989 for CARTRIDGE HANDLING SYSTEM of Wanger, Methlie, Christie, Dauner, Jones, Oliver, and Stavely, now U.S. Pat. No. 5,010,536, (F) Ser. No. filed Mar. 20, 1989 for MECHANICAL SENSE OF TOUCH IN A CONTROL SYSTEM of Oliver, Wanger, Stavely, Methlie, Bianchi, Kato, and Proehl, now U.S. Pat. No. 5,040,159, which are each hereby specifically incorporated by reference for all that is disclosed therein.

SUMMARY OF THE INVENTION

It is an object of the present invention to calibrate the initial location of a mechanism within a control system by monitoring the force being exerted by a motor of the system.

It is another object of the present invention to perform such calibration by using only shaft encoder sensors along with motor voltage and current feedback.

Another object of the invention is to calculate the forces being exerted by the control system.

Another object is to detect obstructions in the system by monitoring the forces being exerted by the system.

Yet another object is to detect completion of an operation of the control system by monitoring the force being exerted.

Another object of the invention is to adjust the movements of the motors of the control system until a desired force or opposition is obtained.

Another object is to detect a cartridge in a transport mechanism by the amount of opposition encountered when the mechanism attempts to move the cartridge to a test area.

Still another object of the invention is to orient the transport mechanism to a known position within a Y axis servo position loop.

Another object of the invention is to orient the transport mechanism to a known position within a Z axis servo position loop.

Another object is to orient the transport mechanism to a known position with respect to two columns that contain cartridges within the cartridge handling system.

Another object is to determine which side of the transport mechanism is oriented in a particular direction.

Another object is to measure the distance required to properly insert a cartridge into a cell of the cartridge handling system.

A still further object is to measure a distance from a Y axis known position to a top translate position within the cartridge handling system.

The above and other objects are accomplished in an optical disk handling system, called an autochanger, having two control systems to provide the six motions necessary to move optical disk cartridges form a storage holding unit array, or cells, to an optical disk reading device, or optical drive. The optical drive, located in the array of cells, reads or writes data on an optical disk in the cartridge. After the reading or writing operation, the cartridge is replaced in its original cell. The system uses shaft encoders on two motors of the two control systems, and current or voltage feedback from the motors, for all positioning. The system uses this method for calibration and for detecting the location of the mechanisms during, and at the end of, moves. The system uses the shaft encoders to position a mechanism close to the eventual move location, then it uses motor current or voltage feedback to determine the opposition to the movement of the mechanism. This opposition, depending on the particular target location, tells the control system whether the mechanism has reached its destination. The amount of opposition is tested to certain limits such that too little opposition means the movement is not complete whereas too much opposition means an obstacle has been encountered.

Data can be located on either side of the optical disk within a cartridge. The control systems use a flip mechanism in the autochanger to turn the cartridge over, allowing either side of the disk to be arranged for reading or writing by the optical drive.

The cells are organized into tow columns. The control systems use a lateral displacement mechanism to move a cartridge from a cell in one column to a cell in the other column, or to move a cartridge between the optical drive, which is located in one of the columns, to a cell in the other column. Also, the mailslot is located in one of the columns, so the control systems use the lateral displacement mechanism to move a cartridge from the mailslot to the other column.

The control systems use a cartridge engaging mechanism to attach to an exposed end portion of a cartridge position in a cell or the optical drive. A longitudinal displacement mechanism is used by the control systems to move the cartridge, after attachment, out of the cell or optical drive. After positioning the cartridge vertically and laterally, the longitudinal displacement mechanism is then used to move the cartridge into a cell or the optical drive, where the engaging mechanism releases the cartridge. Together the cartridge engaging mechanism and the longitudinal displacement mechanism form a mechanism called the transport.

During initialization of the cartridge handling system, it uses the shaft encoders, along with current or voltage feedback from the motors, to calibrate the home locations of ht mechanisms. The system uses the method to determine the home position for vertical movement of the transport up and down the rows of cartridges, as well as to determine the top an bottom positions used for the translate operation. The method is used to calibrate the plunge movement which positions the engaging mechanism to insert or grab a cartridge. The system calibrates the flip movement which presents both sides of a cartridge to the optical drive, and it also calibrates the translate movement between columns of cartridges. Finally, the system determines whether the path for all the movements is free of obstructions.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

Figure 1:
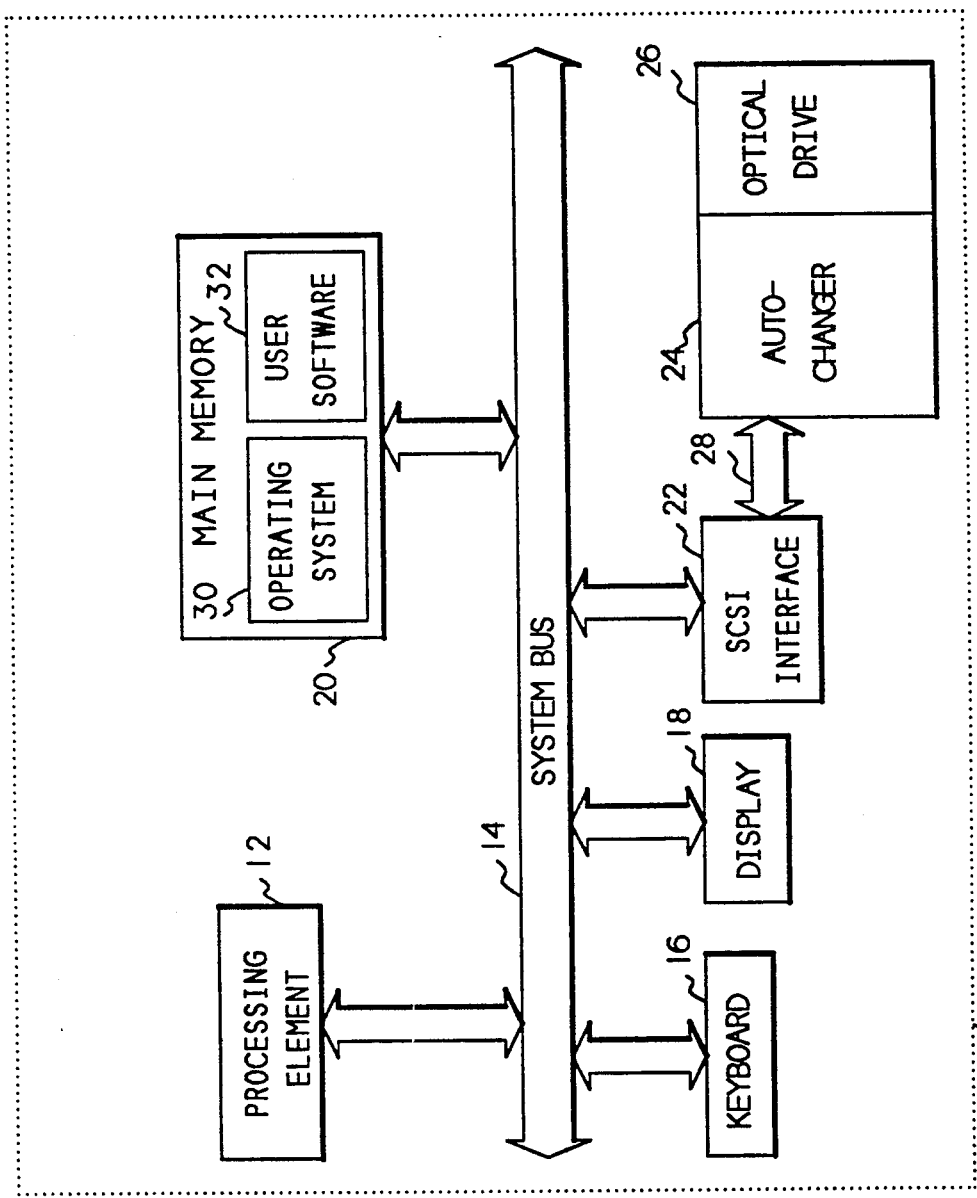
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The optical disk handling system ("autochanger") of the present invention uses two control systems to provide the six motions necessary to move optical disk cartridges from a storage holding unit array ("cells") to an optical disk reading device ("optical drive"). The optical drive, also located in the array, reads or writes data on an optical disk in the cartridge. After the reading or writing operation, the cartridge is replaced in its original cell. A human operator can enter a cartridge into the system through a cartridge insertion mechanism ("mailslot"). Each time an operator enters a cartridge into the mailslot, the control systems move the cartridge either to a cell or the optical drive as requested by the host computer system connected to the autochanger. Cartridges can also be moved from the optical drive or cells to the mailslot for removal by the operator.

During initialization, the control systems calibrate the movements of the Y servo control system, and the Z servo control system. This calibration includes the Y origin location, the Z origin location, and the translation between the columns, as well as other locations described below.

Data can be located on either side of the optical disk within a cartridge. The control systems use a flip mechanism in the autochanger to turn the cartridge over, allowing either side of the disk to be arranged for reading or writing by the optical drive. During initialization, the systems calibrate the flip mechanism to orient a particular side of the assembly upward.

The cells are organized into two columns. The control systems use a lateral displacement mechanism to move a cartridge from a cell in one column to a cell in the other column, or to move a cartridge between the optical drive, which is located in one of the columns, to a cell in the other column. During initialization the systems calibrate the translation location, located at the bottom of the columns. A second translation location is available in some versions of the autochanger, and the systems also calibrate this second location during initialization, if the location is available.

The control systems use a cartridge engaging mechanism to attach to an exposed end portion of a cartridge positioned in a cell or the optical drive. The systems use this mechanism to move the cartridge, after attachment, out of the cell or optical drive. After positioning the cartridge vertically and laterally, the mechanism is then used to move the cartridge into a cell or the optical drive, where it releases the cartridge. During initialization, the systems calibrate the engaging mechanism to determine the optimum distance to move the mechanism to properly insert a cartridge into a cell, the mailslot, or the optical drive.

An important aspect of the present invention is that the longitudinal displacement mechanism, the flip mechanism, the lateral displacement mechanism, the engagement mechanism, and the insertion mechanism are operated by one of the two control systems. The other of the two control systems is used for vertical displacement of the cartridge. The two control systems use motor shaft encoders and current and voltage feedback to control the force applied by the motors, at specific locations in the system, to operate the various assemblies.

A more complete description of the mechanical aspects of the autochanger may be had by referencing the aforementioned patent application (E), and a more complete description of the control system movements during normal operation may be had by referencing the aforementioned patent application (F).

Referring now to FIG. 1, a block diagram of the environment of the present invention is shown. A computer system 10 has a processing element 12 connected to a system bus 14. The processing element 12 receives instructions from a main memory 20 via the system bus 14 and communicates with a human operator using a keyboard 16 for input and a display 18 for output. An interface 22, which is a Small Computer System Interface (SCSI), connects the autochanger 24, via a bus 28, with the computer system 10. The autochanger 24 contains an array of cells for holding a plurality of optical disk cartridges. Each cartridge contains an optical disk which is used for data storage. Incorporated within the autochanger 24 is an optical drive 26, used for reading and writing data on the optical disks within the cartridges. The optical drive 26 is also attached to the system bus 14 through the SCSI interface 22 for transferring data between the drive 26 and the main memory 20 under control of the processing element 12.

The main memory 20 holds the programming instructions of the computer system 10, including an operating system 30 and user software 32. The operating system 30 and the user software 32 combine to control the selection of cartridges within the autochanger 25, and the reading and writing of data by the optical drive 26.

Figure 2:
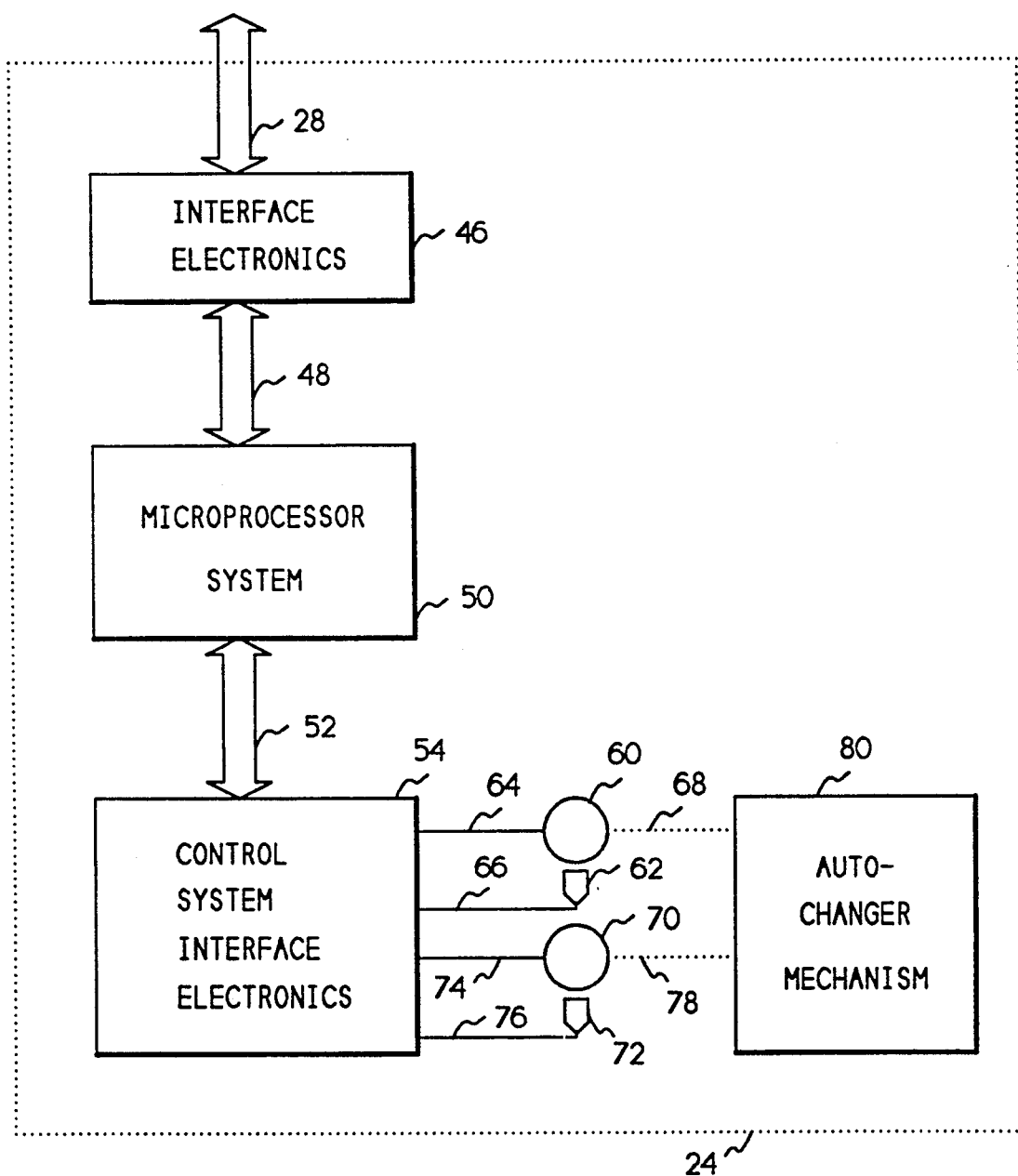
FIG. 2 shows a high level block diagram of the electronics of the present invention.

FIG. 2 shows a high level block diagram of the autochanger 24. An interface bus 28 connects the interface 22 (FIG. 1) to the autochanger interface electronics 46. A microprocessor system 50 connects to the interface 46 through a bus 48. The microprocessor 50 also connects to control system electronics 54 through a bus 52. The microprocessor 50 receives commands from the computer system 10 (FIG. 1) through the bus 28, interface 46, and bus 48. These commands direct the autochanger 24 to move cartridges between cells and the optical drive 26 as well as enter and eject cartridges through the mailslot (not shown). The microprocessor performs these commands by directing two control systems within the autochanger. The microprocessor system also directs the two control systems to perform the steps necessary to calibrate the home locations of the mechanisms within the cartridge handling system.

The control systems have interface electronics 54 which are connected to two motors to drive the mechanical assemblies of the autochanger. The electronics 54 drives a first motor 60 through a pair of connections 64 and receives positional feedback from a shaft encoder 62 via signals 66. The motor 60 is mechanically connected to the autochanger mechanical assemblies 80 through a motor shaft 68. The electronics 54 also drives a second motor 70 through connections 74 and receives positional feedback from a shaft encoder 72 via signals 76. This second motor is mechanically connected to the autochanger mechanical assemblies 80 through a motor shaft 78.

Figure 2A:
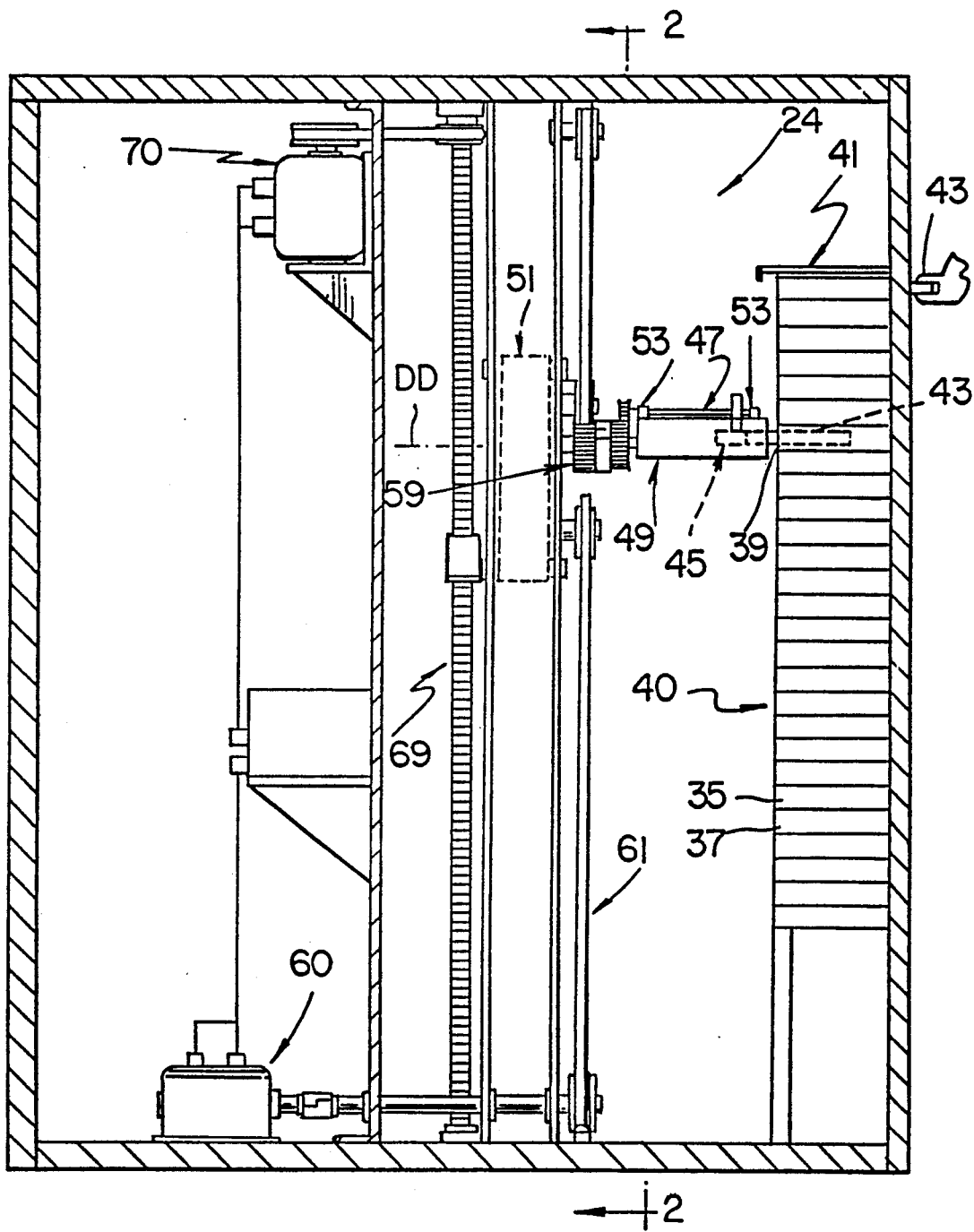
FIGS. 2A and 2B show the mechanical assemblies of the present invention.
Figure 2B:
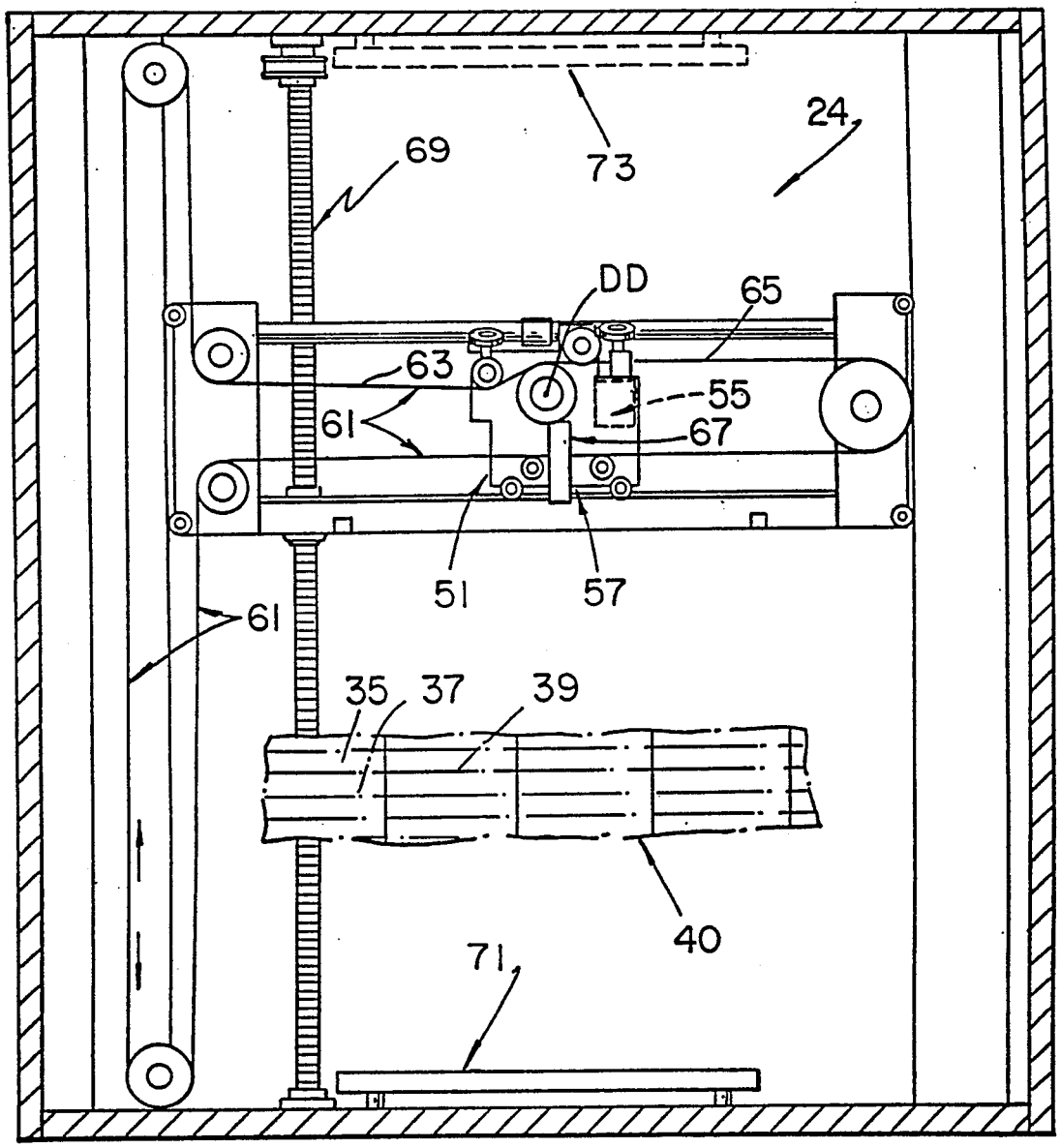

FIGS. 2A and 2B illustrate the mechanical assemblies or mechanisms of the optical disk cartridge handling system 24 for use in association with a plurality of longitudinally extending, rearwardly opening, cells 35, 37, 39, etc., arranged in a laterally and vertically extending cell array 40.

The handling system 24 may comprise an insertion mechanism 41 for receiving a cartridge 43 which is hand-inserted by a human operator with a first end of the cartridge positioned forwardly. The insertion mechanism longitudinally and rotationally displaces the cartridge so as to present the cartridge to a cartridge engaging mechanism with the first end of the cartridge positioned towards the rear of the housing.

The cartridge engaging mechanism 45 is provided for engaging an exposed end portion of a cartridge positioned in the insertion mechanism 41 or in another cell, e.g. 35, 37, 39.

A longitudinal displacement mechanism 47 is operatively associated with the engaging mechanism for longitudinally displacing a cartridge 43 engaged by the engaging mechanism 45.

A flipping mechanism 49 is operatively associated with the engaging mechanism 45 and is used for invertingly rotating a cartridge engaged by the engaging mechanism about a longitudinally extending flip axis DD.

A lateral displacement mechanism 51 is operatively associated with the engaging mechanism 45 for laterally displacing a cartridge 43 engaged by the engaging mechanism.

A rotatable first motor mechanism 60 is drivingly linked to the longitudinal displacement mechanism 43, the flipping mechanism 49, and the lateral displacement mechanism 51 for providing driving force thereto.

Stop mechanism 53 may be provided which limits the movement of the longitudinal displacement mechanism 47.

A flip latch mechanism 55 is provided which has a latched state and an unlatched state and which is operatively associated with the flipping mechanism 49 for preventing rotation thereof when the flip latch mechanism 55 is in the latched state.

A translation latch mechanism 57 is provided which has a latched state and an unlatched state. The translation latch mechanism is operatively associated with the lateral displacement mechanism 51 for preventing lateral displacement thereof when the translation latch mechanism is in the latched state. The translation latch is unlatched by moving it against a translation bar 71. In some versions of the autochanger, a second translation bar 73 is located at the top of the autochanger.

The cartridge handling system 24 has a plunge operating state wherein the stop mechanism 53 is in disengaged relationship with the longitudinal displacement mechanism 47; the flip latch mechanism 55 is in its latched state; and the translation latch mechanism 57 is in its latched state. The cartridge handling system 24 comprises a flipping operating state wherein the stop mechanism 53 is in engaged relationship with the longitudinal displacement mechanism 47; the flip latch mechanism 55 is in its unlatched state; and the translation latch mechanism 57 is in its latched state. The cartridge handling system 24 also comprises a translation state wherein the translation latch mechanism 57 is in its unlatched state.

A first gear mechanism 59 is provided which is mounted in rotationally displaceable relationship with the lateral displacement mechanism 51 and which is drivingly linked to the longitudinally displacement mechanism 4 and the flipping mechanism 49.

A continuous drive belt mechanism 61 is provided which is continuously nonslippingly engaged with the first gear means 59 for drivingly linking the first gear mechanism 59 with the first motor mechanism 60. The continuous belt mechanism may comprise a first portion 63 extending in a first lateral direction from the first gear mechanism 59 and a second portion 65 extending in a second lateral direction from the first gear means. The lateral displacement mechanism 51 is laterally displaceable through movement of the continuous belt mechanism 61 when the first gear mechanism 59 is locked against rotation.

A gear lock mechanism 67 having a locked state and an unlocked state is provided which is operatively associated with the first gear mechanism 59. The gear lock mechanism 67 prevents rotation of the first gear mechanism 59 when the gear lock mechanism is in its locked state. The cartridge handling system 24 is constructed and arranged such that the gear lock mechanism 67 is in its locked state when the translation latch mechanism 57 is in its unlatched state, and such that the gear lock mechanism 67 is in its unlocked state when the translation latch mechanism 57 is in its latched state.

The optical disk cartridge handling system 24 also comprises a vertical displacement mechanism 69 for vertically displacing a cartridge 43 engaged by the cartridge engaging mechanism 45. A second motor 70 is operatively associated with the vertical displacement mechanism 69 for providing driving force thereto.

Figure 3:
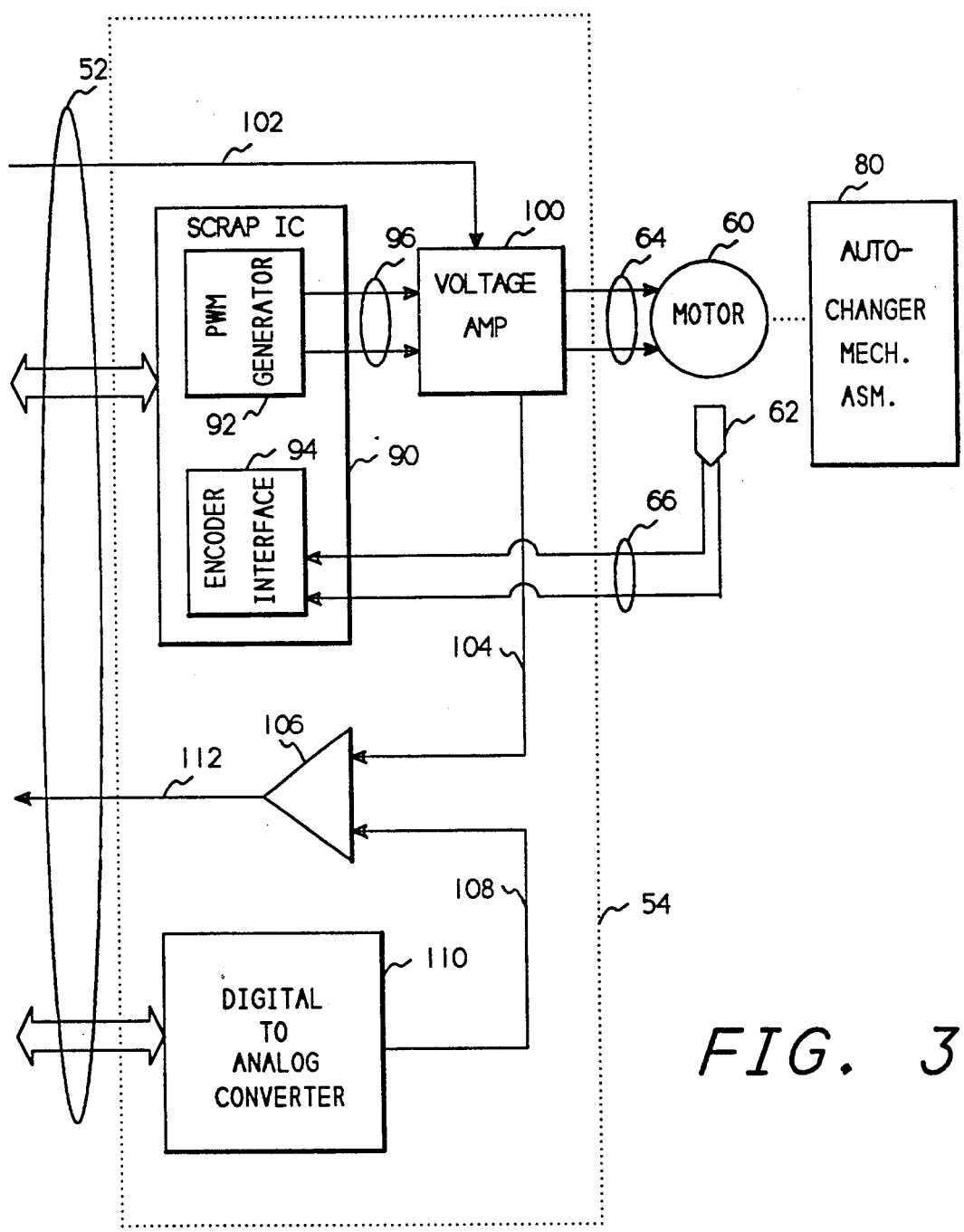
FIG. 3 is a detailed block diagram of the control system interface electronics of the invention.

FIG. 3 depicts a detailed block diagram of the control system electronics, motors, and mechanical assemblies illustrating one of the two control systems of the invention. The method used to drive the motors in the control systems is pulse width modulation ("PWM"), which is commonly used for similar control systems. This method involves controlling motor speed by varying the duty cycle of a constant voltage pulse supplied to the motor, rather than varying the amount of the voltage. Although the PWM method is illustrated, other methods of controlling the motor speed could be used within the scope of the present invention.

Referring now to FIG. 3, the bus 52 transfers data from the microprocessor 50 (FIG. 2) to a pulse width modulation integrated circuit ("IC") 90, which is commercially available as Hewlett Packard part number HCTL-1000. Similar integrated circuits that perform the same functions are available from other manufacturers, such as Motorola part number MC33030, or Silicon General part number SG1731. The IC 90 directly interfaces to the microprocessor bus 52 to allow the microprocessor to write to registers or read from registers within the IC 90 to perform functions necessary to create the PWM output of the IC 90. A PWM generator circuit 92 within the IC 90 accepts a datum from the bus 52 and converts this datum into two, time varying, output signals 96 which are connected to a voltage amplifier 100. Only one of the signals 96 is active at a time, based on the polarity of the datum, and this active signal has a duty cycle which is proportional to the value of the datum—the larger the value, the longer the duty cycle. The signals 96 are amplified by the voltage amplifier 100 to a level suitable for driving the motor 60. The voltage amplifier 100 can be enabled or disabled from the microprocessor by signal 102.

A shaft encoder 62 (also shown in FIG. 2) is a commercially available part that provides a two channel output of the angular position of the motor shaft. Examples of this part are Hewlett Packard part numbers HEDS-5500, HEDS-6000, and HEDS-9000. The shaft encoder 62 is mounted on the shaft of the motor 60 to form a self contained unit. Inside the shaft encoder is an encoder disc (not shown) with a photo transmitter (not shown) on one side of the disc, and a photo receiver (not shown) on the opposite side of the disc. The disc is transparent except for a series of dark lines printed or etched on its surface. Light from the phototransmitter shines through the disc and as the shaft rotates, a pulse train is generated by the dark lines interrupting the light. Two receivers are used, spaced 90 degrees apart, so the two output channels from the receivers can be used to detect the direction of rotation. The pulse train output by the two channels is fed to an encoder interface and counter section 94 of the IC 90. The phase relationship of the two channels determines whether the motor is rotating clockwise or counterclockwise. The IC 90 decodes the phase and counts the number of pulses generated by the shaft encoder 62 and presents this data to the bus 52 for processing by the microprocessor 50. By obtaining the encoder 62 data from the IC 90, the microprocessor determines the speed and direction of rotation of the motor 60. Counters in the encoder interface 94 also maintain motor shaft position.

The control system interface electronics 54 also includes a means of converting the current running through the motor 60 into a signal which the microprocessor can use to determine the amount of such current. The method measures voltage across a sampling resistor (not shown), in series with the motor leads 64, by inputting this voltage 104 into a differential amplifier 106. There it is compared to a known voltage signal output by a digital to analog converter circuit ("DAC") 110. The microprocessor 50 sends data to the DAC 110 which converts the data to an analog signal 108. This signal 108 is compared by the differential amplifier 106 to the voltage signal 104 that represents motor current. The output signal 112 of the differential amplifier 106 is read by the microprocessor 50 to determine if the DAC output 108 is greater than or less than the voltage value 104 for the motor current. In this way, the microprocessor 50 can change the DAC 110 value until the signal 112 changes value, thus determining the motor current.

Figure 4:
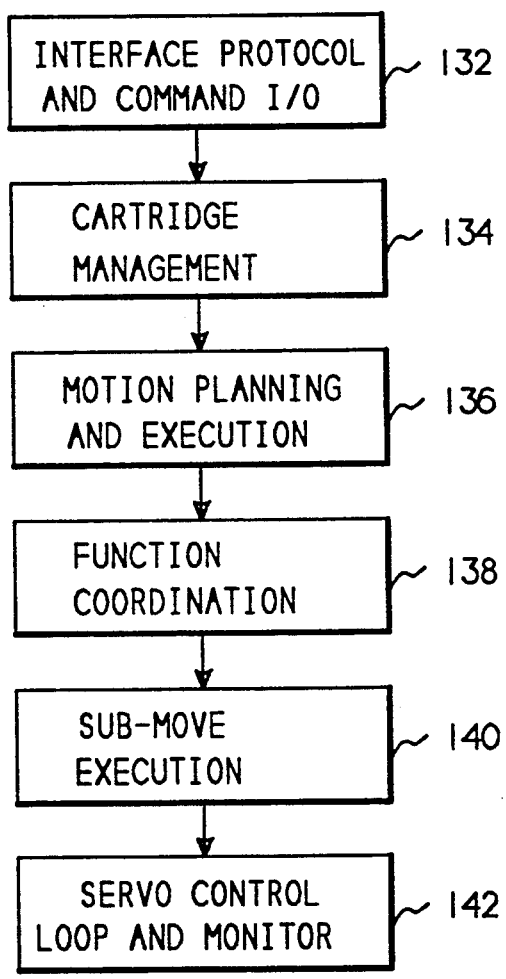
FIG. 4 is a flow diagram of the major modules of the software of the present invention.

FIG. 4 is a high level block diagram of the function to function flow of the software of the present invention, after completion of the initialization process. Block 132, interface protocol and command I/0, interacts with the interface electronics 46 (FIG. 2) to receive commands from the computer system 10 (Fig. 1), and to transmit status back to the computer system 10. Block 132 passes the commands to the cartridge management block 134 which is responsible for keeping the logical arrangement of all locations and their corresponding status. Block 134 also translates interface commands from the computer system into autochanger internal command structures that are passed to the motion planning and execution function, block 136. This function transforms a command structure into a series of autochanger subcommands that will perform the command. Block 136 also sequences the sub-commands to perform the command in the most time-optimal way. Block 138, function coordination, coordinates the series of sub-commands in order to execute the command by modifying the operation of the control systems to properly move each of the required mechanical assemblies. The sub-move execution block 140 performs the lowest level motion in the autochanger in order to perform each sub-command. It coordinates the input position to each of the control systems and generates a move profile for each input based on given acceleration, peak velocity, and force parameters which were supplied by blocks 136 and 138. The servo control loop and monitor, block 142, interfaces with the control system electronics 54 (FIG. 2) to control the position of the motors in the two control systems through a digital compensation algorithm. This block also maintains position, force and velocity data for the two control systems, and it monitors the systems and disables power to the systems if abnormal or unexpected conditions arise.

Figure 5:
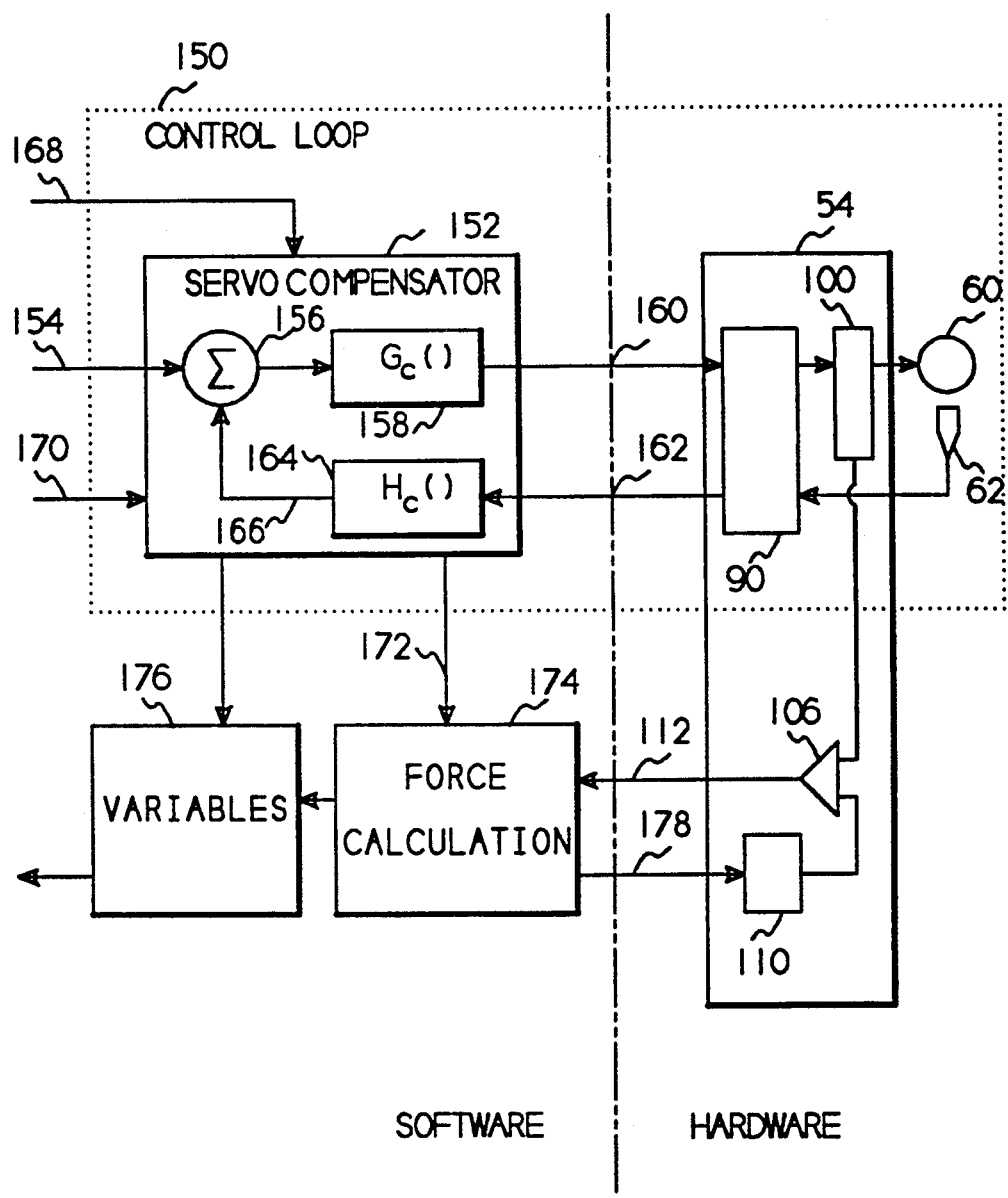
FIG. 5 is a diagram of the servo control system of the present invention.

FIG. 5 shows the servo control system of the present invention. A conventional digital servo control loop 150 is used to control a motor for a control system. The present invention has two such control loops, designated Y control loop, and Z control loop. Each control loop has a servo compensator 152 which inputs a position signal 154 to a summing junction 156. The output of the summing junction 156 is fed to an output transfer function $G_c()$ which converts the output of the summing junction 156 to a signal 160 by multiplying the output 156 by a constant $K_p$. $K_p$ is shown in table 1 for each move of each control system. The resulting value is fed to the IC 90 in the control system interface electronics 54. The signal is then amplified by the amplifier 100 and input to the motor 60. A shaft encoder 62 sends information to the IC 90 which feeds position and velocity information through signal 162 to the feedback transfer function $H_c()$ 164. The feedback transfer function 164 converts the position and velocity information into a negative feedback signal 166 which is input to the summing junction 156. The function $H_c()$ is:

$$H_c() = 1 + K_v d/dt$$

where d/dt is the derivative of the input 162 and $k_v$ is a constant value. $K_v$ is shown in table 1 for each move of each control system. Thus $H_c()$ adds the output position to the derivative of the output position times a constant $K_v$. The values for $K_p$ and $K_v$ depend upon the accuracy and stability requirements for the systems. Increasing $K_p$ reduces position error. Both $K_p$ and $K_v$ determine the control system's stability and performance. In this manner, the control loop 152 changes the position of the motor 60 whenever a new position is received on line 154. As will be described later, the motor 60 may have different loads at different times. To compensate for these different loads, the different compensator values $K_p$ and $K_v$ may be input to the servo compensator 152 by a compensator values signal 168. Also, in the event software determines that the control system must be stopped, a shutdown signal 170 is input to the servo compensator 152 to cause the shutdown.

The force calculation module 174 determines the amount of force being exerted by the motor. It receives compensator values and motor speed from the compensator 152 through signal 172. The mechanical sense of touch of the present invention is the calculation of forces exerted by the autochanger's control systems and the ways in which the force information is used during the autochanger's operation. This mechanical sense of touch uses knowledge of the mechanical parameters of the system to derive the amount of force being exerted by the systems' motors onto the mechanics. A periodic calculation of the force is made by the force calculation module 174 and is made available to other software modules within the system by placing the force information into a variables memory area 176. This force information is used by the other software modules as a sensing mechanism for positional feedback and for detection of abnormal situations within the autochanger. Force is directly related to motor torque by the equation $$F = T_m / r$$

where F is the exerted force created by the motor torque, $T_m$, operating at an effective radius r, where r is determined by the gearing used to attach the autochanger mechanics to the motor mechanism, and / represents division. Motor torque is directly related to motor current by the equation $$T_m = I_m * K_t$$

$I_m$ is the instantaneous motor current and $K_t$ is the motor's torque constant, and * represents multiplication.

Motor current can be calculated by direct measurement via electronics, or by calculation from knowledge of motor voltage and motor speed. The resulting equation becomes $$F = T_m/r = (K_t/r) * I$$

In the present invention, the direct measurement is accomplished by a combination of electronics and software. As described above with reference to FIG. 3, a voltage proportional to motor current from the amplifier 100 is compared to the output of a DAC 110 by a differential amplifier 106. The force calculation module 174 sends a value to the DAC 110 via signal 178, and receives the comparison of this value to the voltage proportional to the motor current via signal 112. The software 174 changes this value until the signal 112 indicates an equal comparison, then the value represents the motor current. Since $K_t$ and r are constants, a new constant K can be calculated in advance, and the resulting equation is $$F = K * I$$

Motor current can also be calculated by the equation $$I_m = (V_m - (K_t * w))/R$$

where $V_m$ is the motor voltage, $K_t$ is the torque constant of the motor, R is the resistance of the motor and associated driver circuits for the motor, and w is the radian velocity of the motor shaft. Since a digital controller is used in the control loop 150, $V_m$ and w are already available in digital form. A simple calculation of the force is made via the equation:

$$F_m = (K_t/(r*R)) * (V_m - (K_t * w)) = (K_1 * V_m) - (K_2 * w)$$

where $K_1 = K_t/(r*R)$ and $K_2 = K_t^2/(r*R)$.

As will be described below, force information is used extensively throughout the controller software as a form of feedback and obstacle detection. The controller can sense the completion of an operation by monitoring the force at strategic times during execution of an operation. The controller can adjust the movements of the motors until a desired force or opposition is obtained. Abnormal situations, which warrant immediate stoppage of all movements, can also be detected by monitoring the force.

After calculation, the force is stored in the variables memory area 176.

BASIC OPERATIONS

Figure 6:
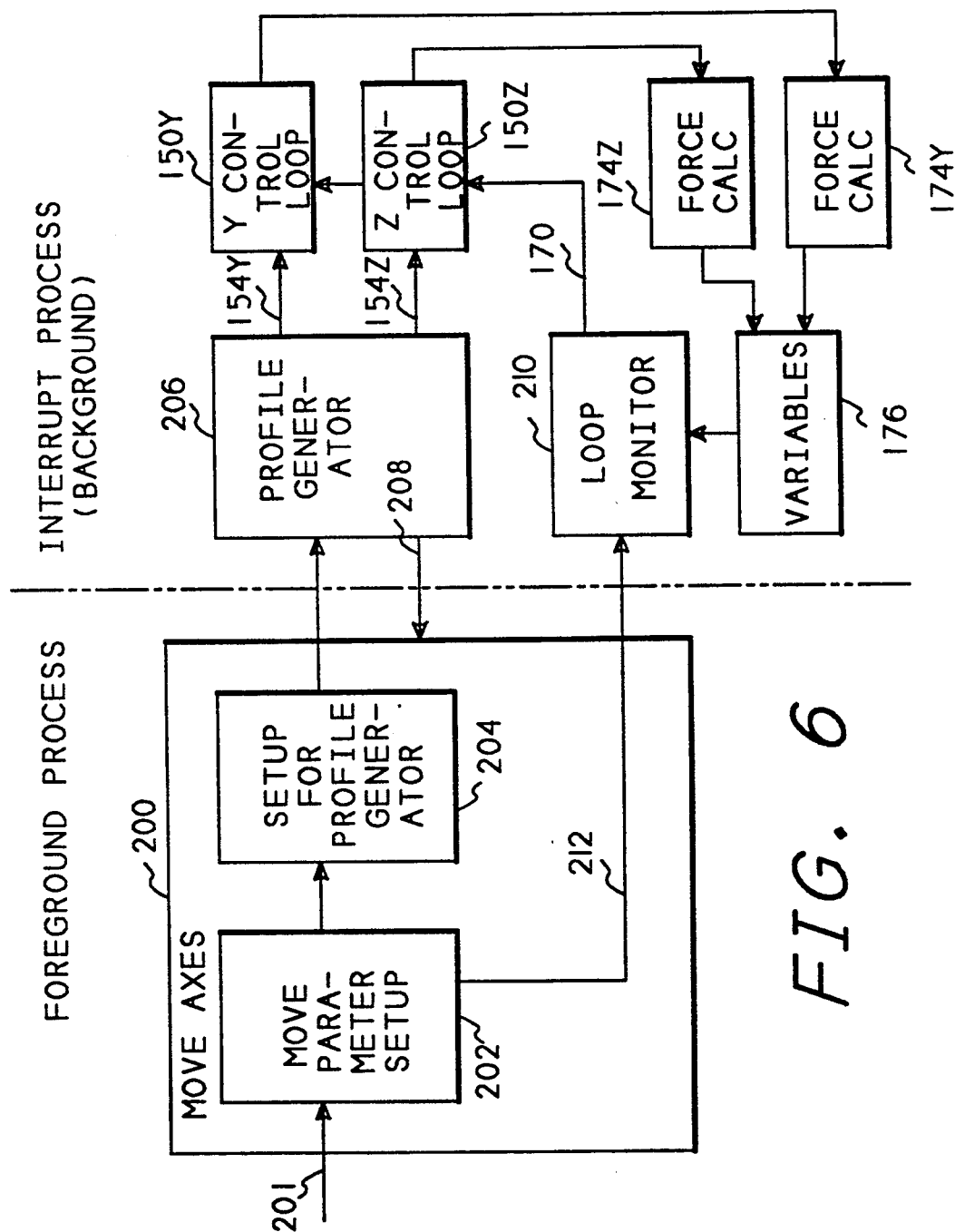
FIG. 6 is a block diagram of the major modules and data flow involved in a move operation.

Referring now to FIG. 6, a block diagram showing the major modules and data flow involved in a move operation is depicted. A move axes module 200, which is one of the sub-move execution modules 140 (FIG. 4), receives input parameters 201 containing delta Y, delta Z, and ID values. Delta Y and delta Z are the number of shaft encoder counts between the current position and the new position. The ID value is used as an index into a lookup table to retrieve the force value that are then passed to loop monitor 210 through signal 212. The table also provides acceleration, in millimeters per second per second, and velocity in millimeters per second, for input to block 204. Table 1 shows the force values, acceleration (Accel) and velocity ($V_p$) for each of the control systems operations. Block 204 converts the acceleration and velocity parameters into data for the profile generator, and provides scaling information for the profile generator. Block 204 then initiates the movement. Once the movement is started, periodic timer interrupts will transfer control to the profile generator 206. Using the parameters passed from block 204, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 202, shutdown force settings were passed to loop monitor 210 via signal 212. The loop monitor 210, described below, compares the shutdown force settings to the forces in the memory variables 176, and shuts down the control loops 150Y and 150Z if the forces exceed safe limits. When the movement is complete, a done signal 208 is returned to the move axes module 200 which, in turn, notifies its caller that the move is complete. Note that the profile generator, control loops, and loop monitor run as background, interrupt driven modules, so the control system is constantly being serviced.

Figure 7:
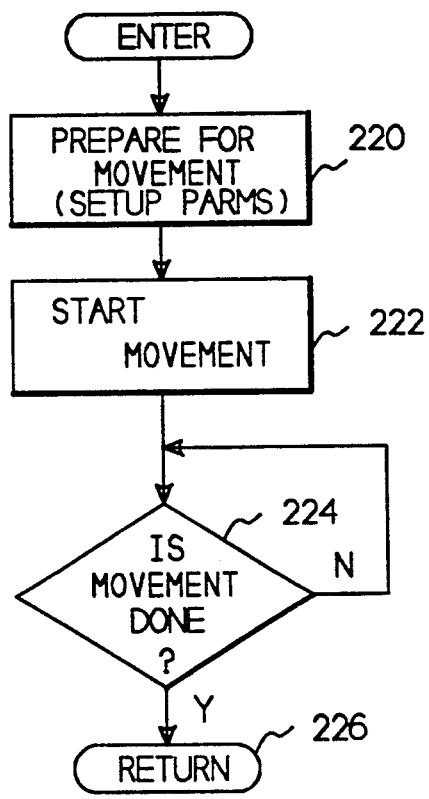
FIG. 7 is a flowchart of a move operation.

FIG. 7 depicts the move axes module process as a control flowchart. After entry, block 220 prepares for movement by setting up the move parameters and the profile generator, block 222 starts the movement, and block 224 just waits on the background processes to complete the move. After completion, control is returned to the caller at block 226.

Figure 8:
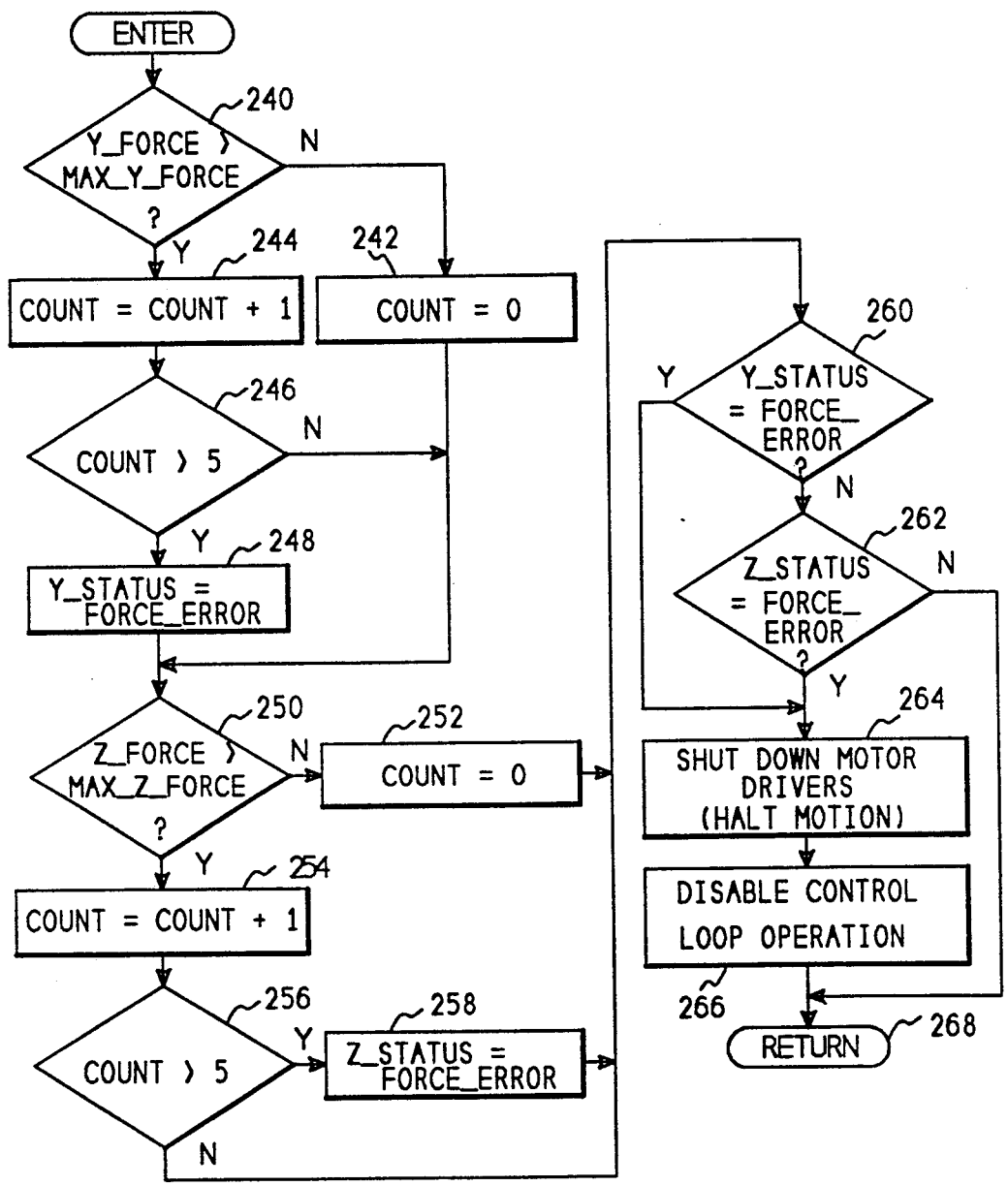
FIG. 8 is a flowchart of the loop monitor that continuously monitors the forces exerted by the control systems.

FIG. 8 is a flowchart of the loop monitor block 210 (FIG. 6)., This module receives maximum force parameters from the move parameter setup block 202 and compares these force values with the force being exerted by the motors, each time it receives control. If the force being exerted exceeds the maximum values, the control systems are both shut down. Referring now to FIG. 8, after entry via a timer interrupt, block 240 compares the force being exerted by the Y control system to the maximum Y force passed from the move parameter setup. If the force is less than or equal to maximum Y force, control transfers to block 242 where a count value is set to zero. The count is used to allow the force to exceed the maximum value for a short period of time without causing shutdown, however, if the force exceeds the maximum value for a longer period, a shutdown will occur. To ensure that the high force occurs over a long period of time, the module sets the count value to zero anytime it gets control and the force is below the maximum.

If the force is greater than the maximum, block 244 increments the count, then block 246 evaluates the count. If the count is greater than a value necessary to ensure that the count has been high for the maximum time allowed, control transfers to block 248 where Y__status is set to force__error, which will cause shutdown. In either case, control transfers to block 250 where the Z force is compared to the maximum Z force. If Z force is less than the maximum, block 252 sets the count to zero, otherwise, block 254 increments the count. Block 256 evaluates the count and if it is large enough, control transfers to block 258 to set Z__status to force__error, which will cause a shutdown.

Control then goes to block 260 and block 262 to check for either a Y__status of force__error or a Z__Status of force__error. If either condition is true, control goes to block 264 to shut down the motor drivers to halt motion, then block 266 disables the control loop so that no new commands go to the motors. If neither block 260 nor block 262 detect an error condition, or after a shutdown, control transfers to block 268 to return from the interrupt.

Figure 9:
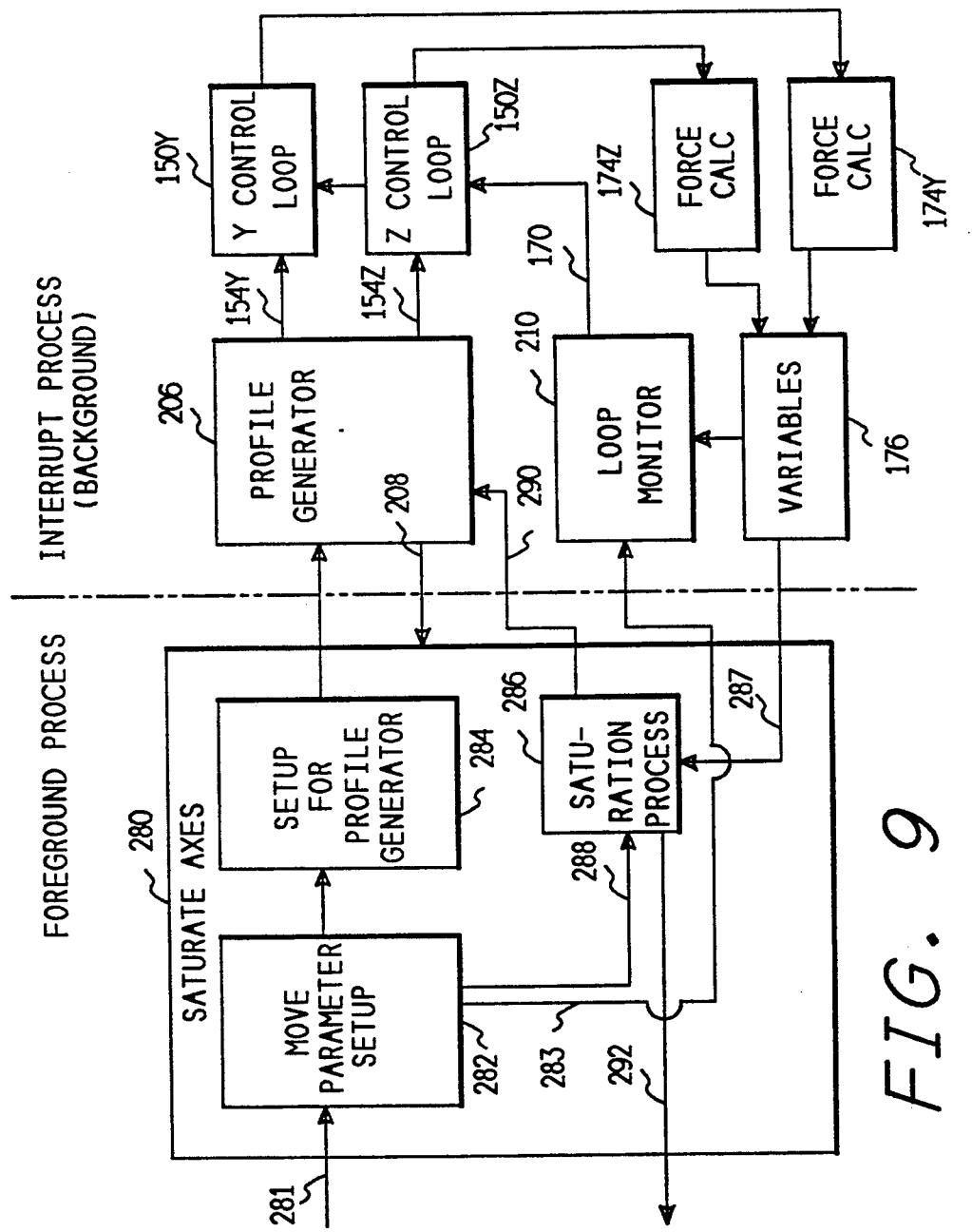
FIG. 9 is a block diagram of the major modules and data flow involved in a saturate operation.

FIG. 9 is a block diagram of a saturate axes operation showing data flow. This operation is like a move operation, except that movement stops either when the destination is reached, or upon detection of a specified force opposing the movement. Referring now to FIG. 9, a saturate axes module 280, which is one of the sub-move execution modules 140 (FIG. 4), receives input parameters 281 containing delta Y, delta Z, and ID values. Delta Y and delta Z are the number of shaft encoder counts between the current position and the new position. The ID value is used as an index into a lookup table to retrieve the force values that are then passed to loop monitor 210 through signal 283. The table also provides acceleration, in millimeters per second per second, and velocity in millimeters per second, for input to block 284. Block 284 converts the acceleration and velocity parameters into data for the profile generator, and provides scaling information for the profile generator. Block 284 then initiates the movement. Once the movement is started, periodic timer interrupts will transfer control to the profile generator 206, which is the same as the profile generator of FIG. 6. Using the parameters passed from block 284, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 282, shutdown force settings, which are twice the value of the threshold force settings, were passed to the saturation process 286 via signal 288. Threshold force settings were passed to loop monitor 210 via signal 283. The loop monitor 210, described above, compares the shutdown force settings to the forces in the memory variables 176, and shuts down the control loops 150Y and 150 if the forces exceed safe limits. When the movement is complete, a done signal 208 is returned to the saturate axes module 200 which, in turn, notifies its caller that the operation is complete. The saturate process 286 also monitors variables 176, via signal 287, to determine when they exceed the threshold values passed from block 282, and when either force exceeds the threshold, movement is stopped through the stop signal 290. At this time saturate status is made available through status signal 292. Note that the profile generator, control loops, and loop monitor run as background, interrupt driven modules, so the control system is constantly being serviced. The saturate process runs in a foreground loop.

Figure 10:
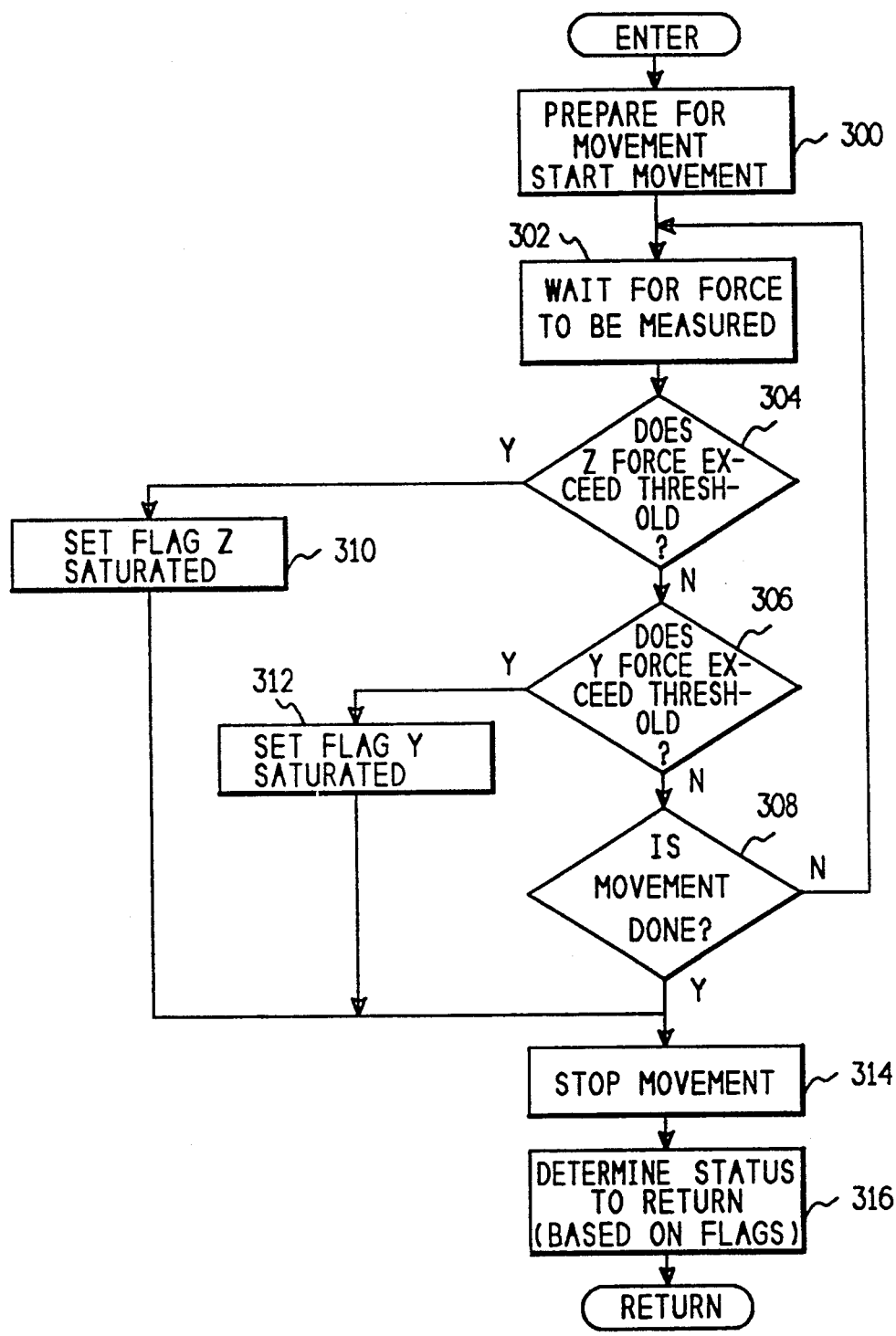
FIG. 10 is a flowchart of the saturate operation.

FIG. 10 is a flowchart of the saturate axes operation. After entry, block 300 prepares for movement by processing the input parameters, delta Y and delta Z, passing shutdown force values to the loop monitor, profile parameters to the profile generator, threshold force values to the saturation process, and then starting the movement. Block 302 waits for a force value to be measured (by the timer interrupt driven force calculation modules), then block 04 determines if the Z force exceeded the Z threshold. If the force did not exceed the threshold, control passes to block 306 to check the Y force value against the Y threshold parameters. If both forces are less then the threshold, control goes to block 308 to determine if the movement is done, that is, has the movement reached the final position. If the movement is not done, control goes back to block 302 to perform the same checks. If the Z force exceeds the threshold, control goes to block 310 to set the Z saturated flag; if the Y force exceeds the threshold, control goes go block 312 to set the Y saturated flag. In either case, or if movement is done, control goes to block 314 to stop movement. Block 316 then determines status to return and returns to the caller.

The move axes and saturate axes routines described above will be used in the following routines that perform specific operations. In the following descriptions, note that the Y control system moves the engaging, flipping and longitudinally displacing apparatus, also called the transport, vertically, and the Z control system plunges the engaging mechanism outward to retrieve a cartridge, plunges the engaging mechanism inward, flips the transport, and performs the translation movement of the transport. The Z control system also moves the cartridge insertion mechanism of the mail-slot.

INITIALIZATION AND CALIBRATION

Figure 11:
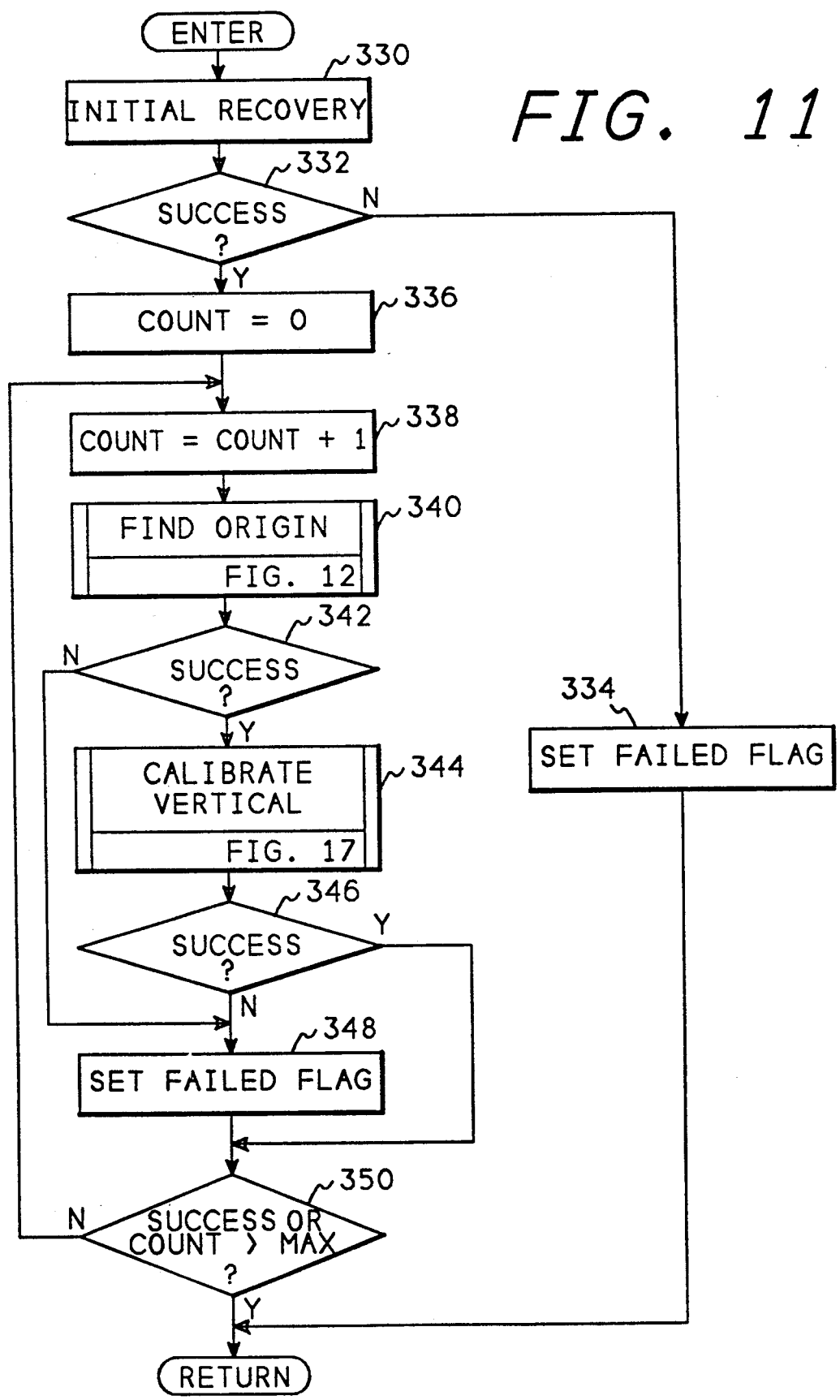
FIG. 11 is a flowchart of the top level of the initialization process used to calibrate the system.

FIG. 11 is a flowchart of the top level of the initialization of the cartridge handling system showing the calibration process for finding the home position within the servo control systems for each mechanism. Finding home is a sequence of moves, involving mechanical sense of touch, that the control systems use to move the mechanisms into a known position called the origin. This sequence is performed each time the machine powers up and it is also performed as a part of the control systems error recovery. Since there are no sensors on the transport, the routines that perform the sequence use the mechanical sense of touch to acquire knowledge about the position and orientation of the transport. This knowledge is gradually acquired as each routine is executed, and each routine depends upon the knowledge acquired by the previous routines.

Referring now to FIG. 11, after entry, block 330 closes the servo position loops by placing arbitrary values for their positions. These arbitrary values are simply a starting place, and have no relationship to the calibration values that will result from the initialization process. Block 330 moves a small amount vertically up and down, while monitoring the force encountered. If this force remains small, the systems know there is no cartridge partially in the transport. If a force is encountered, a cartridge may be partially in the transport, so the engaging mechanism is moved outward to either grab the cartridge, or return it to its storage cell. Either case is acceptable, since a later test will 10 determine if a cartridge is present in the transport. The important point during this step is to ensure that the cartridge does not block the transport. Next, the engaging mechanism is moved to a full inward position which will either completely retract the engaging mechanism, complete a translate, if a translate had been in process, or complete a flip, if a flip had been in process. In any case, after this movement, the engaging mechanism will be completely inside the transport and will be protected from damage.

If the initial recovery is not successful, block 332 transfers to block 334 to set a failed flag. When initial recovery is not successful, the transport is in a state where it cannot be moved, probably because a cartridge is partially in the transport, and partially out of the transport. Since the transport cannot be moved, the initialization process cannot continue until a human operator removes the obstacle, so control returns the caller after the failed flag is set.

If initial recovery is successful, control goes to block 336 to set a retry count to zero. After initializing the count, block 338 increments the count for the next try at calibration. Block 340 calls the find origin routine (FIG. 12) to orient the Y an Z servo control systems, and to translate to the rightmost column. If the find origin is successful, block 342 transfers to block 344 to calibrate for vertical movements. If vertical movements calibrates, block 346 transfers to block 350 to determine the status of calibration. Blocks 342 and 346 transfer to block 348 if either calibrate routine fails. After block 348 sets the failed flag, or if both calibrate routines were successful, control goes to block 350 to determine if a retry is necessary. A maximum of four retrys may be performed, so if a failure occurred, block 350 transfers back to block 338 to retry. Otherwise, initialization was successful, and control returns to the caller.

Figure 12:
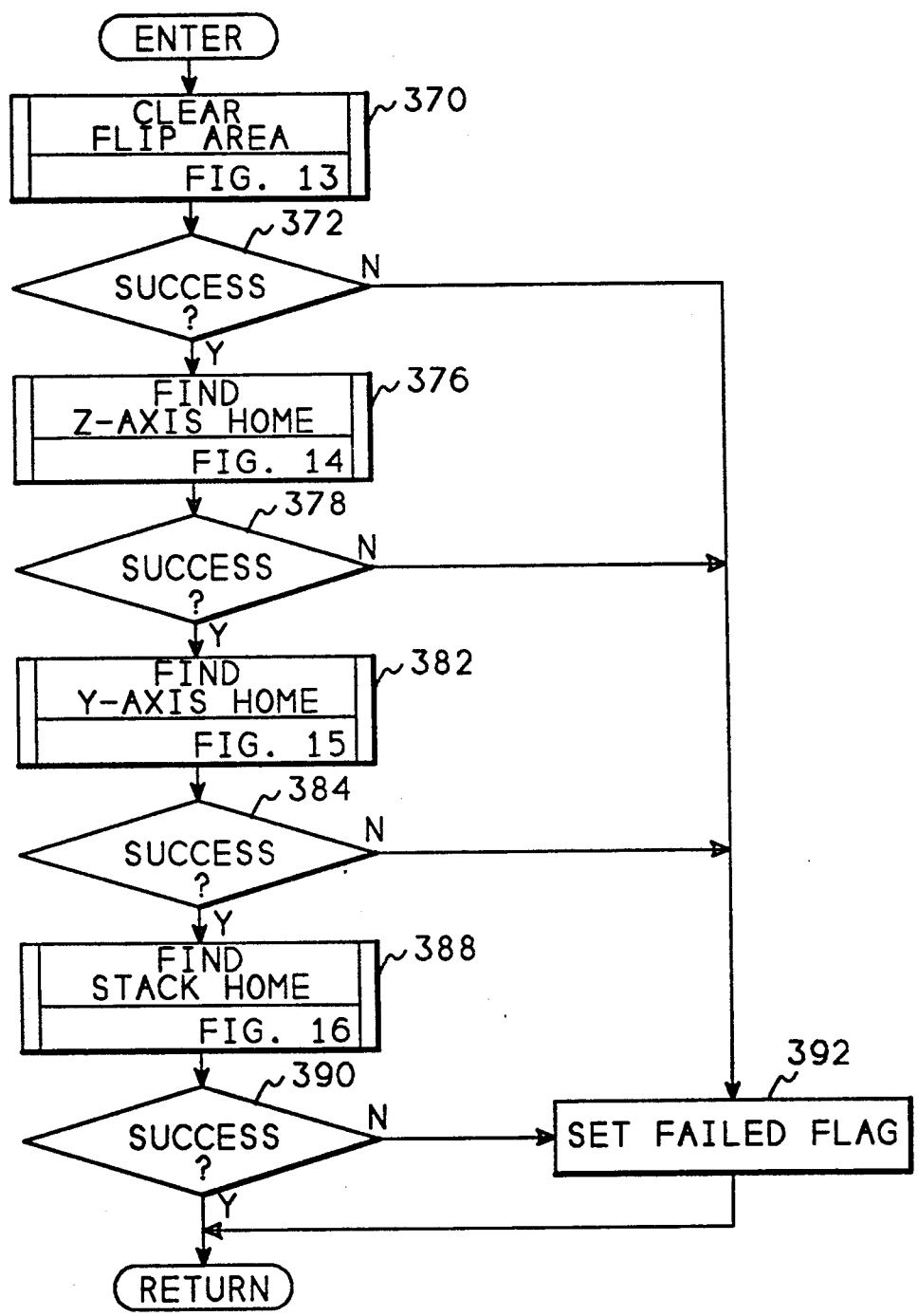
FIG. 12 is a flowchart of the routine that finds the origin locations for the Y and Z servo control systems.

FIG. 12 depicts a flowchart of the find origin routine called from FIG. 11. After entry, Block 370 calls the clear flip area routine of FIG.. 13 to ensure that the transport has sufficient room to perform a flip operation. If this routine is successful, block 372 transfers to block 376, otherwise, control goes to block 392 to set the failed flag and return to the caller. Block 376 calls the find Z-axis home position, FIG.. 14, to relocate the Z servo control system to its origin. If successful, block 378 transfers to block 382, otherwise control transfers to block 392 to set the failed flag and returning to the caller. Block 382 calls find Y-Axis home, FIG. 15, to relocate the Y servo control system to its origin, and if successful control transfers to block 388. Otherwise, control goes to block 392 to set the failed flag and return to the caller. Block 388 calls the find home stack routine, FIG. 16, to relocate the transport in front of the rightmost of the two columns. If successful, control returns to the caller, otherwise block 392 sets the failed flag before returning control to the caller.

Figure 13:
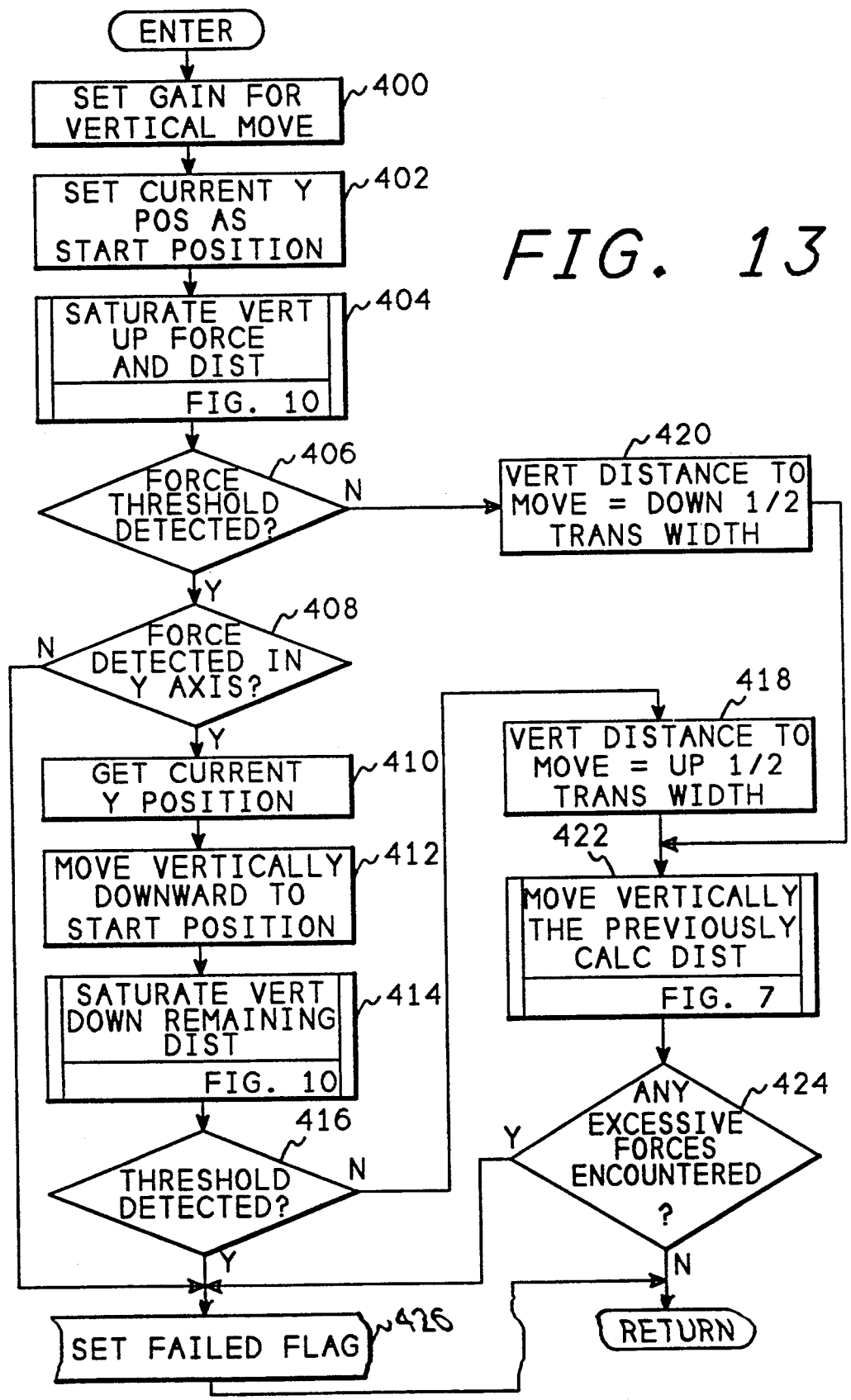
FIG. 13 is a flowchart of a routine to ensure that no obstructions exist before initialization starts.

FIG. 13 shows the clear flip area routine called from FIG. 12. This routine performs a series of vertical movements, while employing the mechanical sense of touch, to locate an unobstructed area in which the transport will be free to perform a flip operation. The system first moves the transport upward until it either senses a large force or has moved a distance equal to the width of the transport, since this is sufficient distance to perform a flip. If the transport moved the full distance without encountering a large force, the system repositions the transport to the midpoint of the starting and ending locations, then returns to the caller. If the transport encountered a force during the move, it records the distance moved, returns to the starting location, and then tries to move downward a distance equal to the width of the transport less the distance of the previous movement. If this move is successful, the system positions the transport half way between the extreme positions. If this second move failed, there is an obstruction which is close enough to prevent a flip, and a failed flag is set before returning to the caller.

Referring now to FIG. 13, after entry, block 400 sets the system gains for a vertical move. Note that the gain settings, distance, force values and other parameters are shown in Table 1 for all the moves depicted in the various flowcharts. Block 402 saves the current Y servo control system position for later use. Block 404 calls saturate axes to move the transport upward the maximum distance or until N pound of force are encountered (see table 1, CLEAR FLIP UP, under CLEAR FLIP AREA, for the force and distance). Block 406 determines how the saturate axes move was completed. If the saturate axes move completed by going the entire distance, control transfers to block 420 since no obstacles were found. Block 420 calculates the desired position for the transport, which is half the maximum distance, and transfers to block 422 to position the transport. If the saturate axes move completed by encountering a large force, block 406 transfers to block 408 to determine if the force was a threshold force or an error force. If the force was an error force, control goes to block 426 to set the failed flag before returning to the caller. If the force was the threshold force, then the upper bound of travel for the transport has been found, so control transfers to block 410 to save this location. Then block 412 calls move axes to move downward back to the original starting position, which was saved by block 402. Block 414 then calls saturate axes to move downward for a distance equal to the difference between the maximum distance possible, and the distance already moved upward (see table 1, CLEAR FLIP DOWN, under CLEAR FLIP AREA, for the force and distance). If the move encounters a force, rather than stopping after moving the calculated distance, block 416 transfers to block 426, since an obstruction must have been encountered. If the move completed the calculated distance, block 416 transfers to block 418 which calculates the midpoint of the two moves, before transferring to block 422 to move the transport to the midpoint. After moving the transport to the midpoint, block 424 makes another check to determine if any forces were encountered during the moves, and if so, control goes to block 426 to set the failed flag. Otherwise, control returns to the caller.

Figure 14:
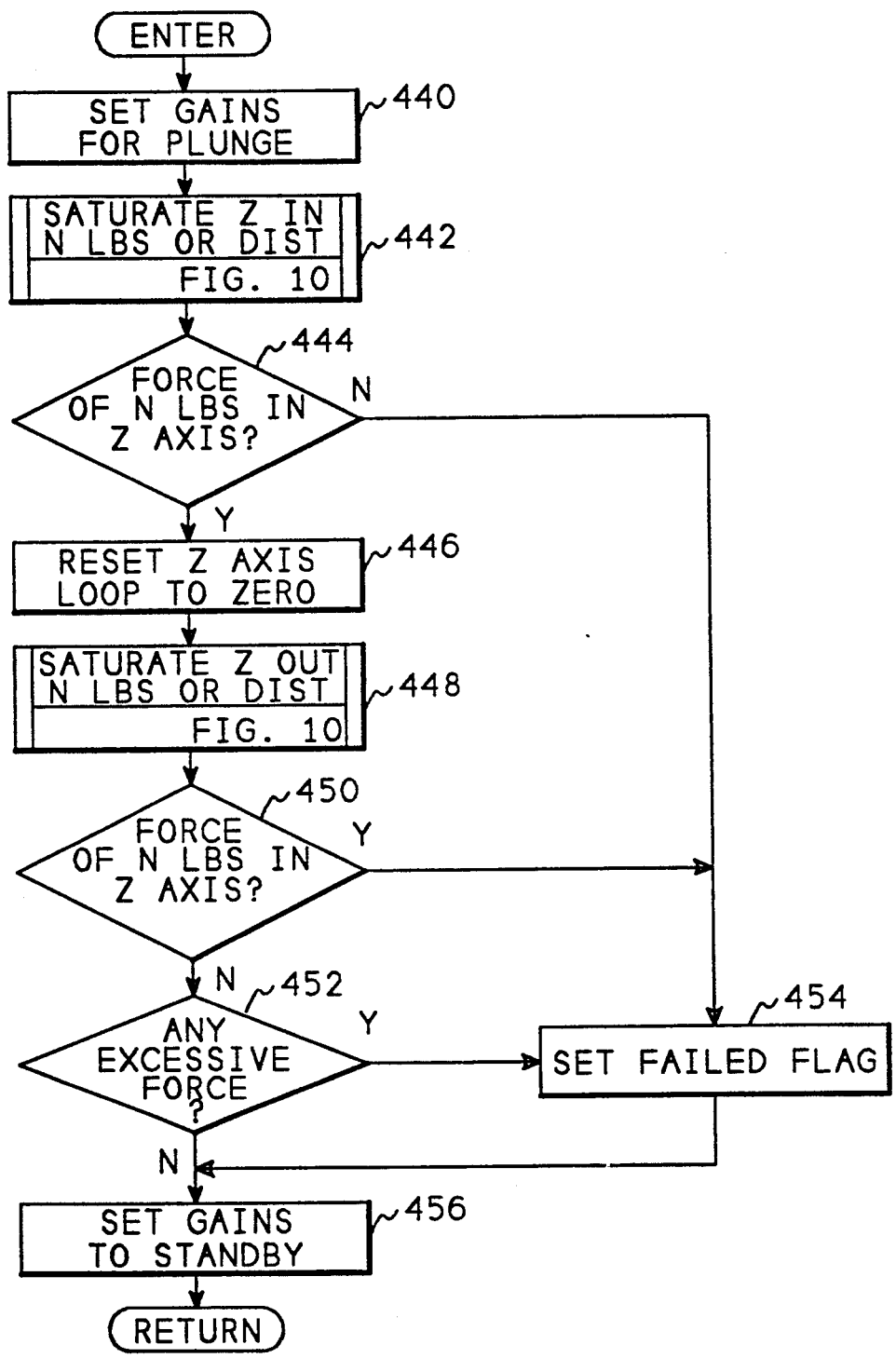
FIG. 14 is a flowchart that finds the home position for the Z servo control system.

FIG. 14 is a flowchart of a routine to relocate the Z servo control system to its origin position. This is done by retracting the engaging mechanism until a maximum distance is reached or until a force is encountered. This operation will complete any partial flip that had been in progress and move the mechanism against a hard stop, which is the origin location.

Referring now to FIG. 14, after entry, block 440 sets the gains for a plunge operation. Block 442 then calls saturate axes to move the engaging mechanism more than the maximum distance inward, or until a force is encountered (see table 1, Z HOME SAT 1, under FIND Z HOME, for the force and distance). Block 444 then determines if a force was encountered, and if not, control transfers to block 454 to set the failed flag since the mechanism moved farther than should be possible. If the force was encountered, block 444 transfers to block 446 to reset the Z origin value to the current Z-axis location. Then block 448 calls saturate axes to move the engaging mechanism a maximum distance outward (see table 1, Z HOME SAT 2 under FIND Z HOME for the force and distance). Block 450 checks the result of the saturate axes move, and if a force was encountered, control transfers to block 454 to set the failed flag since the mechanism failed to move the complete distance. If the force was not encountered, control goes to block 452 to determine if any other error forces were encountered, and if so, control goes to block 454 to set the failed flag. If no other forces were encountered, control goes to block 456 where the system gains are set to standby, and control returns to the caller.

Figure 15:
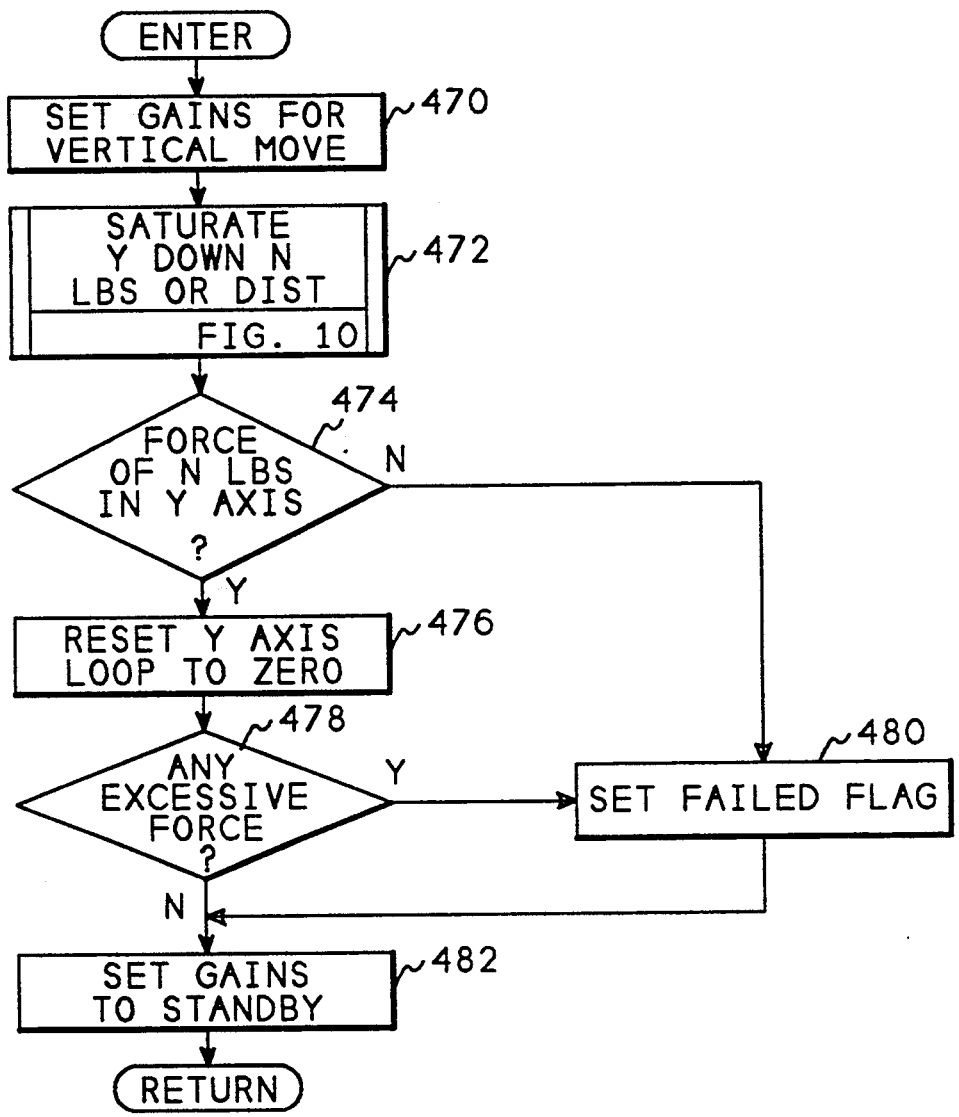
FIG. 15 is a flowchart of a routine that finds the home position for the Y servo control system.

FIG. 15 is a flowchart of a routine to relocate the Y servo control system to its origin position. This is done by moving the engaging mechanism to the translate position, which allows the lateral translation latch to operate, and then moving the transport downward to the lowest possible position or until a force is encountered. This operation will move the mechanism against a hard stop, which is the Y origin location.

Referring now to FIG. 15, after entry, block 470 sets the gains for a vertical movement. Block 472 then calls saturate axes to move the transport more than the maximum distance downward, or until a force is encountered (see table 1, FIND Y HOME, for the force and distance). Block 474 then determines if a force was encountered, and if not, control transfers to block 480 to set the failed flag since the mechanism moved farther than should be possible. If the force was encountered, block 474 transfers to block 476 to reset the Y origin value to the current Y-axis location. Control then goes to block 478 to determine if any other error forces were encountered, and if so, control goes to block 480 to set the failed flag. If no other forces were encountered, control goes to block 482 where the system gains are set to standby, and control returns to the caller.

Figure 16:
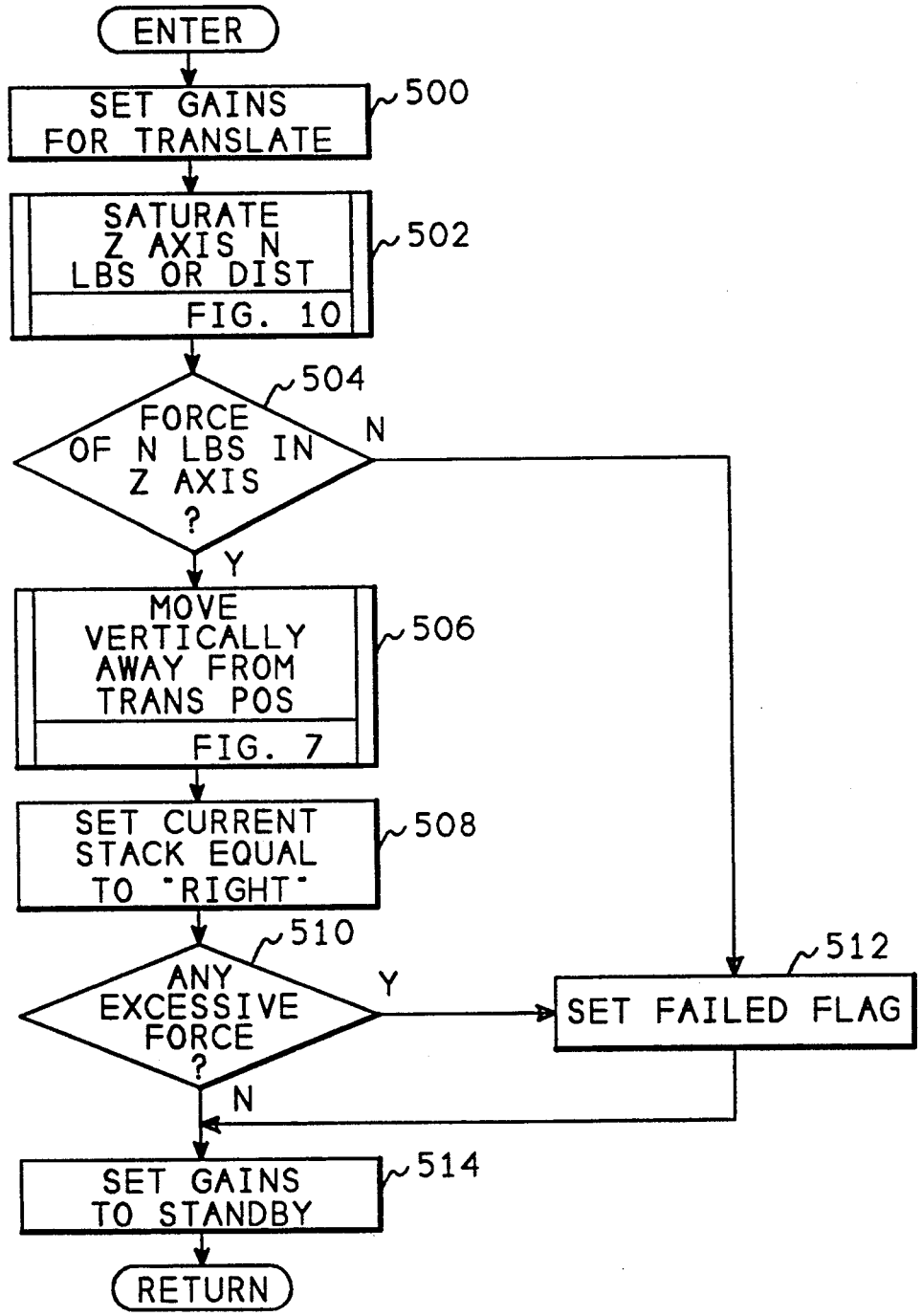
FIG. 16 is a flowchart of a routine that places the transport in front of one of the columns.

Fig. 16 is a flowchart of a routine to relocate the transport to one of the columns. This is done by moving the transport more than the maximum possible distance or until a force is encountered. This operation will move the mechanism against a hard stop, which is the second of the two columns.

Referring now to FIG. 16, after entry, block 500 sets the gains for a translate movement. Note that this routine is called by FIG. 12 after calling find Y-axis home, which put the transport into the translate position. Block 502 then calls saturate axes to move the transport more than the maximum distance laterally, or until a force is encountered (see table 1, STACK HOME SAT, under FIND STACK HOME, for the force and distance). Block 504 then determines if a force was encountered, and if not, control transfers to block 512 to set the failed flag since the mechanism moved farther than should be possible. If the force was encountered, block 504 transfers to block 506 which calls move axes to move vertically away from the translate position, which allows the translate latch to reset. Then block 508 resets the current stack position to the current transport location. Control then goes to block 510 to determine if any other error forces were encountered, and if so, control goes to block 512 to set the failed flag. If no other forces were encountered, control goes to block 514 where the system gains are set to standby, and control returns to the caller.

Figure 17:
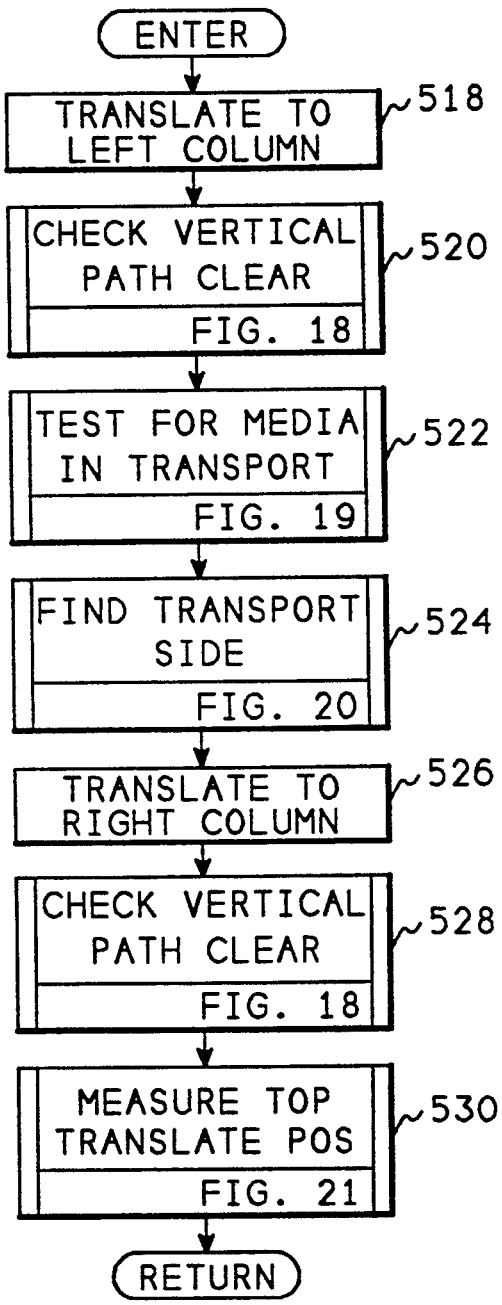
FIG. 17 is a flowchart of a routine that initializes vertical movement.

FIG. 17 is a top level flowchart of the calibrate vertical process, called from FIG. 11. Referring now to FIG. 17, after entry block 518 moves the transport to the left column, and block 520 calls the check vertical path routine, FIG. 18, to ensure that the left column is clear of obstructions. Block 522 calls FIG. 19 to test for media in the transport, and block 524 calls FIG. 20 to determine which side of the transport is facing upward. Block 526 moves the transport to the right side, and block 528 calls FIG. 18 again to ensure that the right column is clear of obstructions. Finally, block 530 calls FIG. 21 to find the location of the top translate position for the Y servo control system before returning to the caller.

Figure 18:
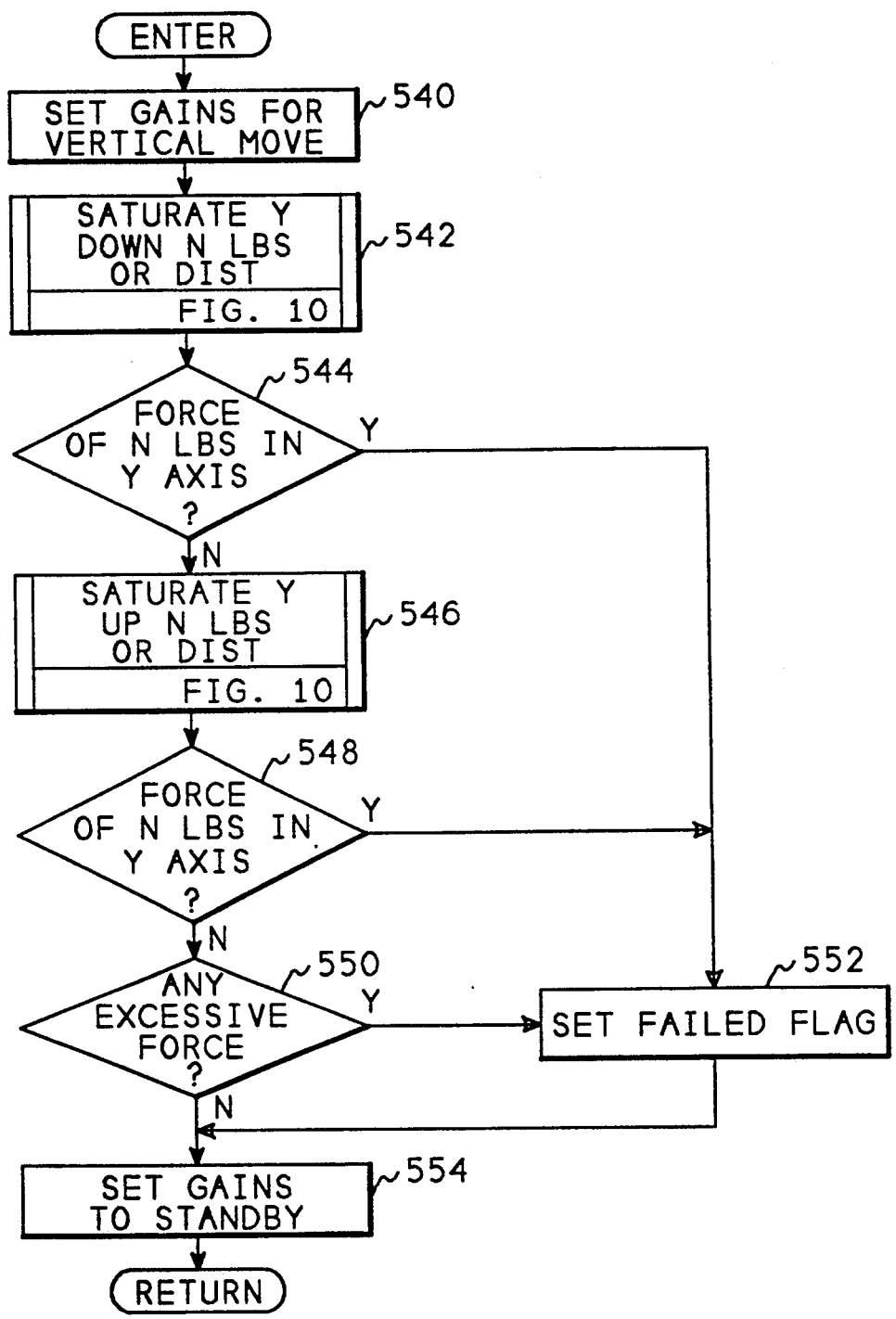
FIG. 18 is a flowchart of a routine that ensures that the transport can move vertically without encountering obstructions.

FIG. 18 is a flowchart of a routine to check for obstructions in the path traversed by the transport as it moves over one of the two columns of the cartridge handling system. This routine moves the transport to the bottom of a column while monitoring the force on the Y-axis servo control system. It then moves the transport to the top of the column, again monitoring force. It performs these movements slowly so that the mechanical sense of touch can have a greater sensitivity, and if any of the movements fail, a failed flag is set to indicate that manual intervention is required.

Referring now to FIG. 18, after entry block 540 sets the gains for a vertical movement (see table 1 for the specific settings). Block 542 then calls saturate axes to move the transport downward to the minimum height or until a force is encountered (see table 1, MEASURE VERT 1 under CHECK VERTICAL PATH CLEAR, for the distance and force). After the movement, block 544 determines if a force was encountered, and if it was, control goes to block 552 to set the failed flag, since no force should have been encountered during the move. If a force was not encountered, control goes to block 546 which calls saturate axes to move upward to the maximum top position (see table 1, MEASURE VERT 2, under CHECK VERTICAL PATH CLEAR, for the distance and force). Again, no force should be encountered, so block 548 transfers to block 552 to set the failed flag if it finds a force. If no force is found, control goes to block 550 to check for forces encountered by the Z servo control system, and the failed flag is set if a force was found. If no forces were encountered, or after the failed flag has been set, control goes to block 554 to return the system gains to standby before returning to the caller.

Figure 19:
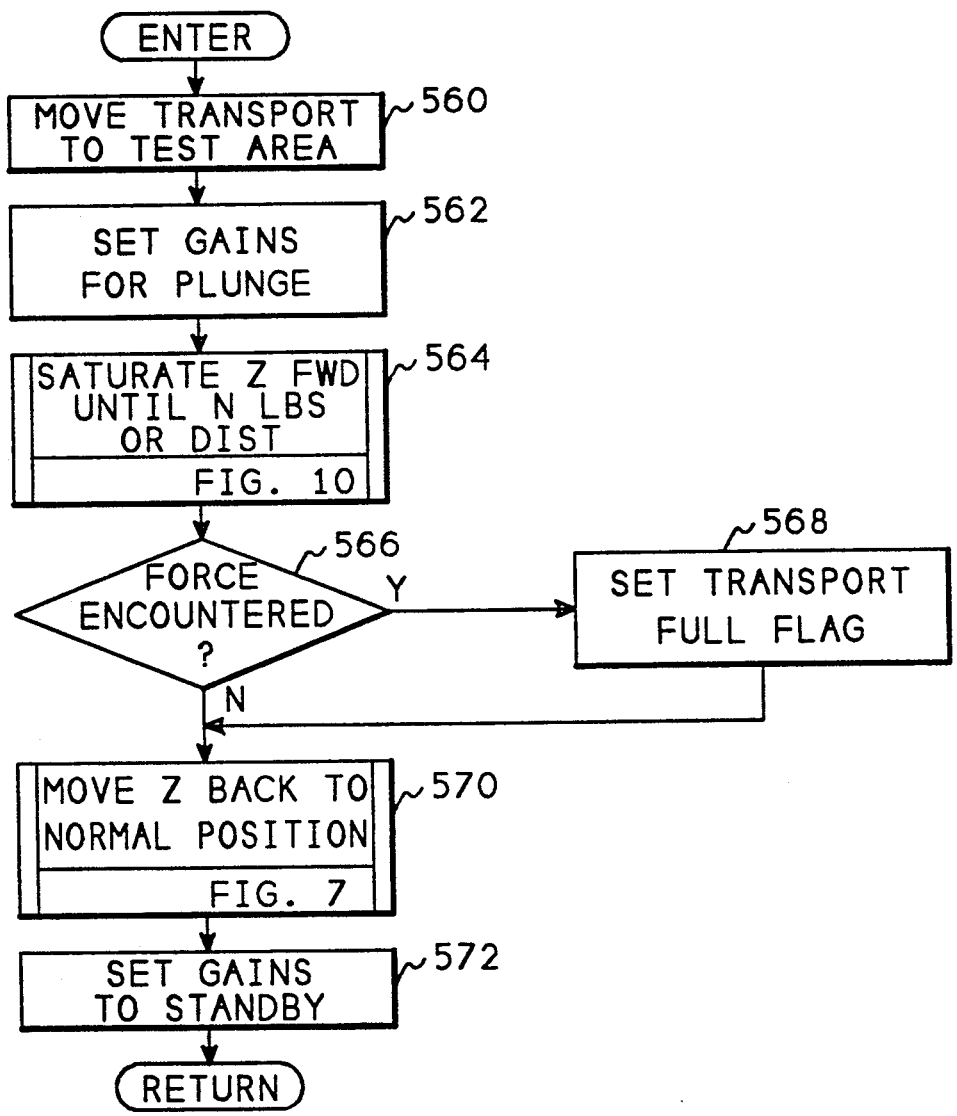
FIG. 19 is a flowchart of a routine that tests for media in the transport.

FIG. 19 is a flowchart of a process to test the transport to determine if a cartridge is present. After entry, block 560 moves the transport to a test area, which is an area above the top cell of the left column. This area contains a metal plate which prevents cartridge insertion. Block 562 sets the control system gains for a plunge operation, and block 564 calls saturate axes to move the engaging mechanism to a target position, or until a force of N pounds is encountered (see table 1, TEST TRANSPORT SAT, under TEST FOR CART IN TRANSPORT, for force and distance). If the correct force is encountered, block 566 transfers to block 568 to set a flag indicating that the transport is full. After indicating that the transport is full, or the correct force was not encountered, control transfers to block 570 where move axes is called to move the engaging mechanism back to the rest position. Then block 572 sets the control system gains to standby, and control returns to the caller.

Figure 20:
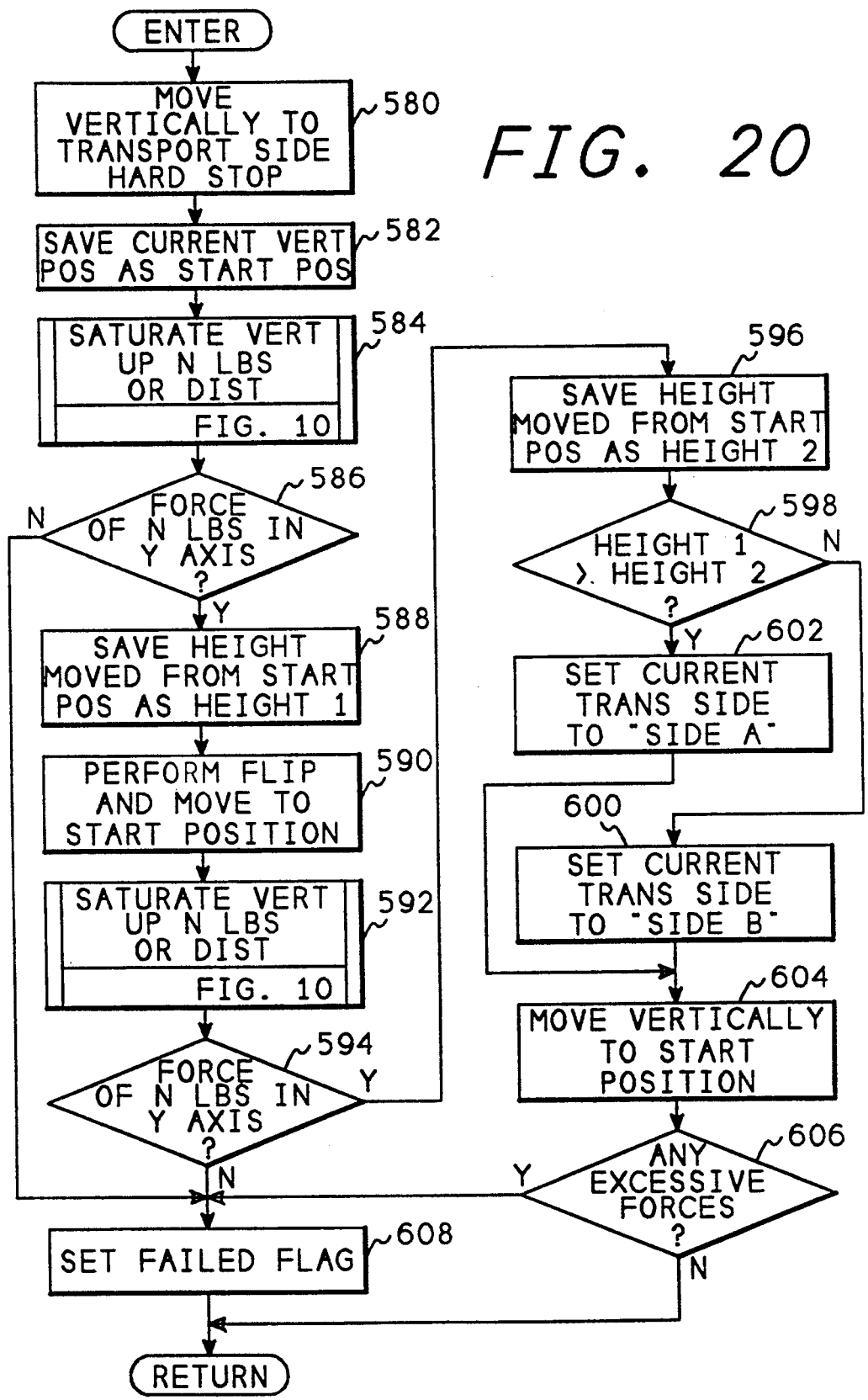
FIG. 20 is a flowchart of a routine that determines which side of the transport is positioned upward.

FIG. 20 is a flowchart of a routine to determine which side of the transport is facing upward. To make this determination, the control systems move the transport to the upper left side of the cartridge handling system. This move allows the transport to engage a mechanical tab that protrudes inward form the cartridge handling system mechanical frame at this location. This tab, along with a tab that protrudes from one side of the transport, is used to determine which side is facing upward.

Referring now to FIG. 20, after entry block 580 moves the transport to the top of the left column. Block 582 then saves the current vertical position, and block 584 calls saturate axes to move the transport upward (see table 1, FIND TRANS SAT 1, under FIND TRANSPORT SIDE, for the force and distance). The transport should not travel the full distance, therefore a force should be encountered, so if no force is found, block 586 transfers control to block 608 to set the failed flag. If the force is found, control goes to block 588 to save the height of the transport and to move the transport back to the vertical position saved in block 582. Block 590 then performs a flip and block 592 then calls saturate axes to move the transport upward again (see Table 1, FIND TRANS SAT 2, under FIND TRANSPORT SIDE for force and distance values). Again, the transport should not travel the full distance, so if no force is found, control transfers to block 608 to set the failed flag. If the force is found, control goes to block 596 to save this second height position. One of the two moves upward should have caused the two tabs to contact each other, so the height on this move will be less that the height of ht move where the two tabs did not contact. Block 598 then compares the two height positions form the two upward moves. If the first height is greater than the second height, control goes to block 602 to set a flag indicating side A of the transport is facing upward, otherwise control goes to block 600 to set the flag to side B. In either case, control goes to block 604 which calls move axes to return the transport to its starting position. Block 606 then checks for any excessive forces, and if one or more were found, control goes to block 608 to set the failed flag. If no forces were found, or after setting the failed flag, control returns to the caller.

Figure 21:
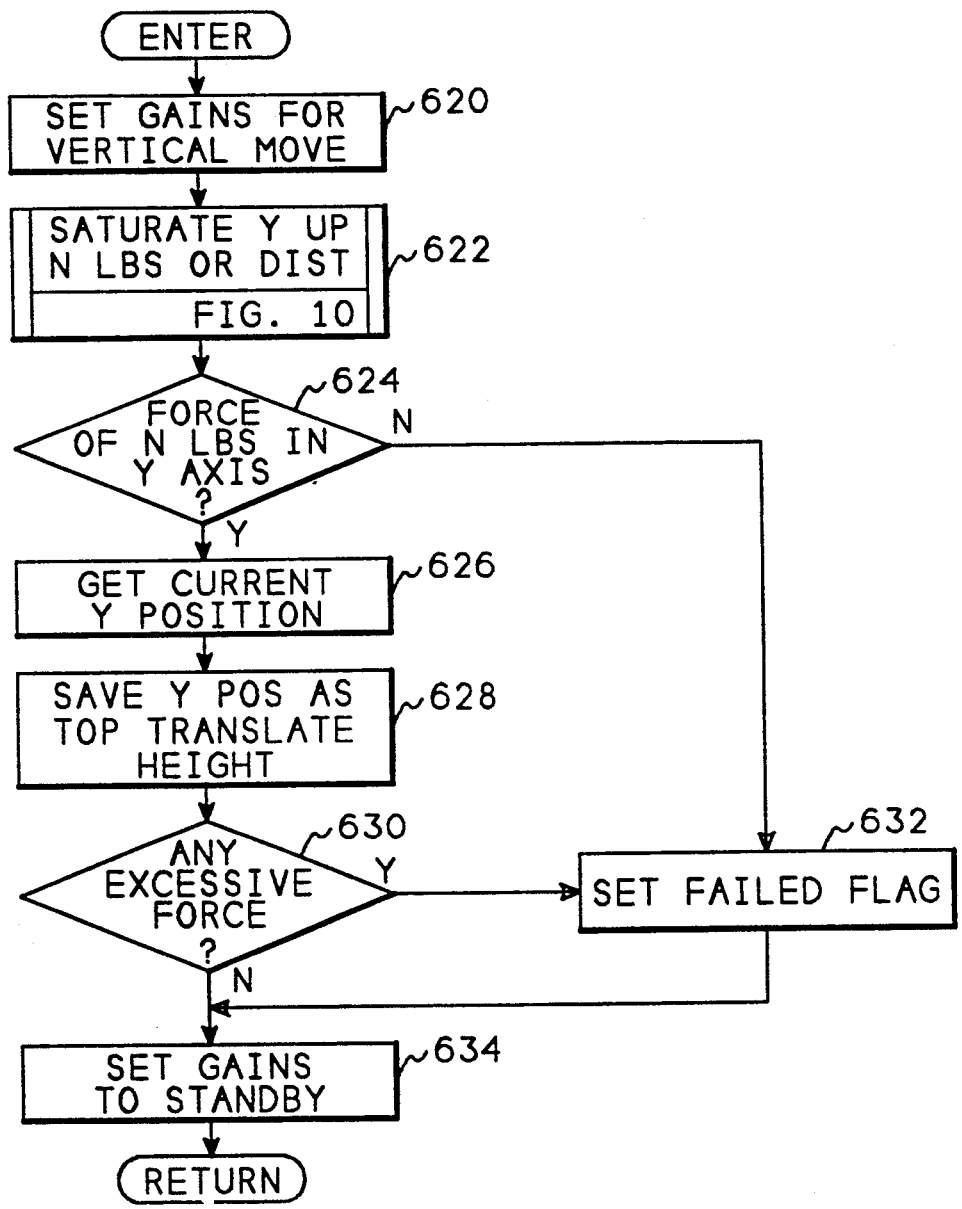
FIG. 21 is a flowchart of a routine that finds the second translate position.

FIG. 21 is a flowchart of a process to measure the distance to the top translate position. After entry, block 620 sets the gains for a vertical move (see table 1 for the specific gain settings). Block 622 then calls saturate axes to move the transport upward the maximum distance (see table 1, MEASURE TOP, under MEASURE TOP TRANSLATE HEIGHT, for the force and distance settings). The transport should encounter a translate bar at the top of the columns (see reference 73 in FIG. 2B), so if no force is encountered, control goes to block 632 to set the failed flag. If the force is found, control goes to block 626 to get the current position of ht Y servo control system, which is saved as the top translate position by block 628. Block 630 checks for any excessive force encountered and if so, control goes to block 632 to set the failed flag. If no excessive forces were encountered, or after setting the failed flag, control goes to block 634 to set the system gains to standby before returning to the caller.

Two additional calibration functions are not performed during initialization, but instead are performed when the mechanism they calibrate is first used. Both functions calibrate the plunge distance needed to insert a cartridge, and since they require that a cartridge be in the transport before calibration, they are not performed in initialization, but are performed the first time a cartridge is moved into a cell, the mailslot, or the transport. One function calibrates this distance for insertion into a cell, and the other function calibrates plunge for an insertion into the optical drive.

Figure 22:
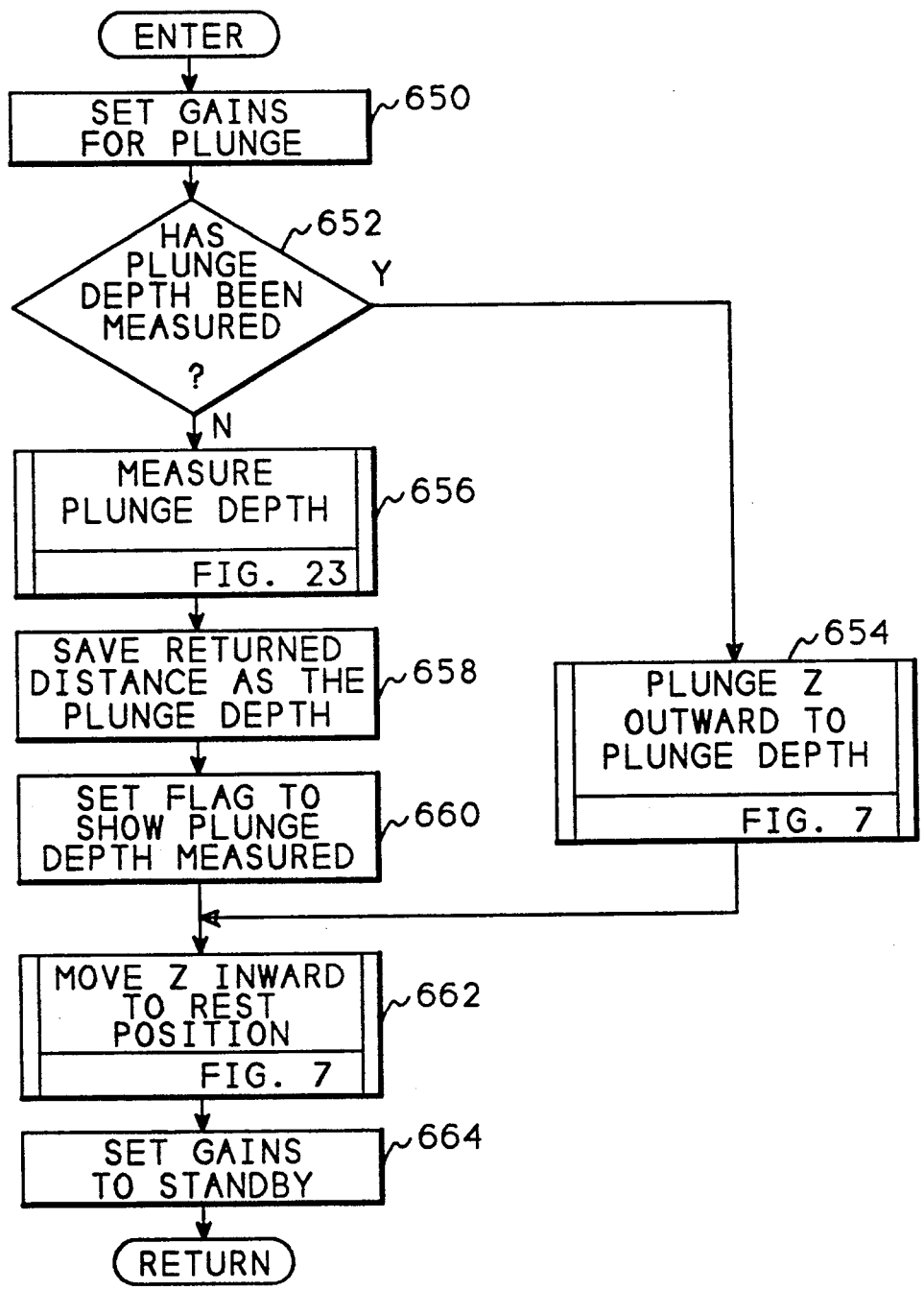
FIG. 22 is a flowchart of a routine to get a cartridge from a cell, including a test for distance initialization.

FIG. 22 is a flowchart of the process for retrieving a cartridge from a cell, which incorporates calibration of the plunge distance. Referring now to FIG. 22, after entry block 650 sets the gains for a plunge (see table 1 for the specific gains). Block 652 then determines if the plunge distance has been calibrated, and if so, control goes to block 654 to call move axes to get the cartridge. If the distance has not been calibrated, control goes to block 656 which calls FIG. 23 to calibrate the distance and move the engaging mechanism into the cell. Then block 658 stores the distance measured as the plunge depth, and block 660 sets the flag to indicate that the calibration has been performed. Block 662 then calls move axes to pull the engaging mechanism back to pull the cartridge into the transport, and block 664 sets the systems gains to standby before returning to the caller.

Figure 23:
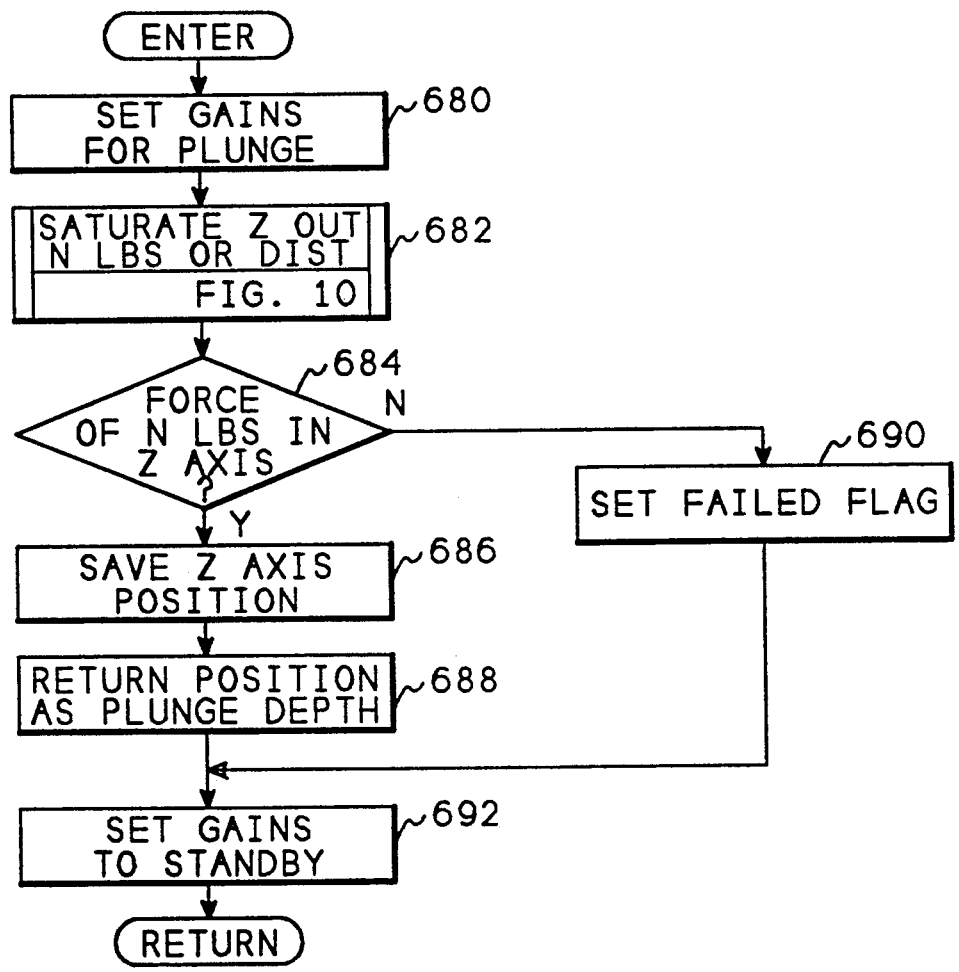
FIG. 23 is a flowchart of a routine to measure the optimum distance to move the engaging mechanism for cartridge insertion or removal.

FIG. 23 is a flowchart of the process of measuring the plunge distance. The expected plunge distance is a function of the design of the mechanics of the system, however there are mechanical tolerances associated with this distance. In order to have reliable plunges, these tolerances must be calibrated out, and the mechanical sense of touch of the present invention is used to perform this calibration. This routine measures the depth of a cell, or the mailslot, by positioning in front of the desired cell, saturating outward until a specified force is encountered, and then storing the position at which the force was encountered as the depth of the cell or mailslot.

Referring now to FIG. 23, after entry, block 680 sets the control systems gains for a plunge operation (see table 1 for specific gain settings). Block 682 then calls saturate axes to move the engaging mechanism outward (see table 1, MEAS CELL SAT, under MEASURE PLUNGE DISTANCE, for the force and distance). The engaging mechanism should encounter a cartridge, which would exert a fore on the mechanism, so if block 684 does not find a force, control goes to block 690 to set the failed flag. If the force is encountered, control goes to block 686 to get the value of the Z-axis position, which block 688 returns as the plunge depth. Block 692 sets the system gains to standby before returning to the caller.

Figure 24:
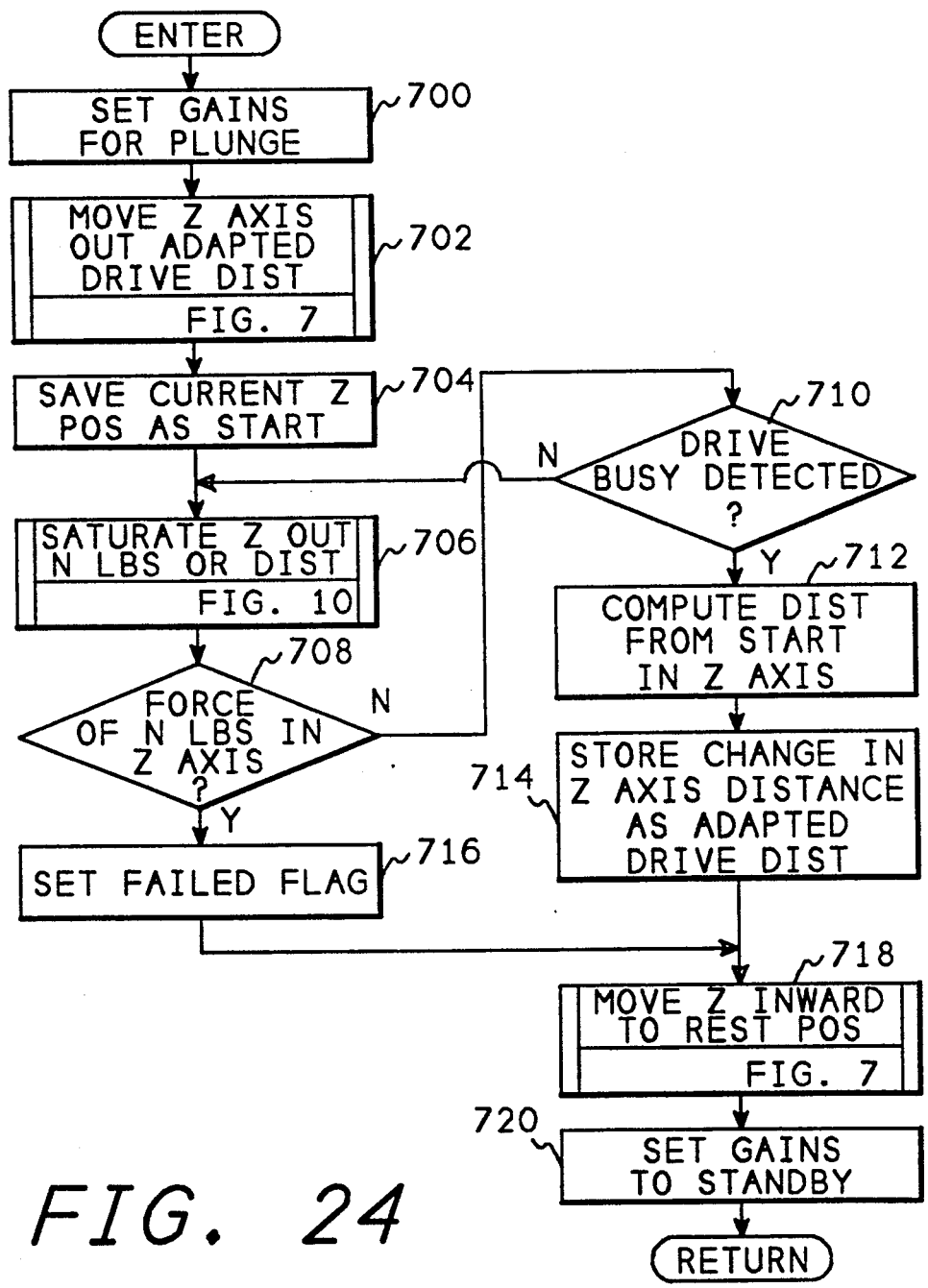
FIG. 24 is a flowchart of a routine for inserting a cartridge into the optical drive, including calibration of the distance to the drive.

FIG. 24 is a flowchart of the process of measuring the plunge depth into the optical drive. This process is similar to measuring the plunge depth into a cell, but must be modified to account for the fact that once the drive accepts the cartridge, it pulls the cartridge into itself. The drive insert routine first moves the engaging mechanism nearly all the way into the drive. The drive busy signal is then monitored while small plunge movements are performed. The movements are performed until the drive accepts the cartridge, indicated by the drive busy signal, or until a large force is detected. If the force is encountered, an error is reported, otherwise the distance necessary to move to get drive busy is recorded as the plunge distance. This process is repeated each time a cartridge is inserted into a drive, so the distance is constantly being recalibrated. If the cartridge handling system contains more than one optical drive, the process is repeated for each optical drive.

Referring now to FIG. 24, after entry block 700 sets the control systems gains for a plunge operation (see table 1 for specific gain settings). Block 702 then calls move axes to move the engaging mechanism outward to a location just short of the expected drive busy distance. Block 704 then calls move axes to move the engaging mechanism outward to a location just short of the expected drive busy distance. Block 704 saves the current Z-axes location and block 706 calls saturate axis to perform a small movement outward (see table 1, DRIVE INSERT, for the force and distance). Block 708 then checks for a force encountered, and if it finds a force, control goes to block 716 to set the failed flag, since the cartridge must have reached the end of the drive slot without the drive going busy. If a force is not found, control goes to block 710 to check the busy signal, and if the drive is not yet busy, control returns to block 706 to perform another small move. This movement continues until either the drive goes busy, or the force is encounterd. If the drive goes busy, control transfers to block 712 to compute the distance traveled during the small moves, and block 714 saves this distance as the adapted drive plunge distance. Block 718 then calls move axes to pull the engaging mechanism back into the transport. Block 720 sets the gains to standby before returning control to the caller.

Having thus described a presently preferred embodiment of the present invention, ti will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| Operation ID | $V_p$ mm/s | Accel mm/s2 | Y_force lbs | Z_force lbs | DIST Eu's | Gain See Below |
|---|---|---|---|---|---|---|
| CLEAR FLIP AREA | | | | | | |
| CLEAR FLIP UP | 32 | 320 | 12 | 12 | 16410 | Vertical |
| CLEAR FLIP DOWN | 32 | 320 | 12 | 12 | 16410 | Vertical |
| FIND Z HOME | | | | | | |
| Z HOME SAT 1 | 32 | 320 | 19 | 18 | 29735 | Plunge |
| Z HOME SAT 2 | 32 | 320 | 19 | 18 | 760 | Plunge |
| FIND Y HOME | 32 | 320 | 18 | 14 | 33195 | Vertical |
| FIND STACK HOME | | | | | | |
| STACK HOME SAT | 32 | 320 | 18 | 11.5 | 16046 | Translate |
| CHECK VERTICAL PATH CLEAR | | | | | | |
| MEASURE VERT 1 | 250 | 1500 | 12 | 12 | 31920 | Vertical |
| MEASURE VERT 2 | 250 | 1500 | 12 | 12 | 31920 | Vertical |
| FIND TRANSPORT SIDE | | | | | | |
| FIND TRANS SAT 1 | 32 | 320 | 11 | 12 | 2500 | Vertical |
| FIND TRANS SAT 2 | 32 | 320 | 11 | 12 | 2500 | Vertical |
| MEASURE TOP TRANSLATE HEIGHT | | | | | | |
| MEASURE TOP | 32 | 320 | 18 | 14 | 33195 | Vertical |
| TEST FOR CART IN TRANSPORT | | | | | | |
| TEST TRANS SAT | 32 | 320 | 18 | 9 | 2480 | Plunge |
| MEASURE PLUNGE DIST | | | | | | |
| MEAS CELL SAT | 120 | 5720 | 18 | 12.5 | 24524 | Plunge |

TABLE 1-continued

| | Control System Parameters | | | | | |
|---|---|---|---|---|---|---|
| Operation ID | $V_p$ mm/s | Accel mm/s2 | Y_force lbs | Z_force lbs | DIST Eu's | Gain See Below |
| DRIVE INSERT | 120 | 5720 | 18 | 12 | 57 | Plunge |

$V_p$ is peak velocity allowable in millimeters per second.
Accel is the acceleration to use when ramping velocity up/down, in millimeters per second per second.
Y_force is the saturation threshold for the Y control system in pounds.
Z_force is the saturation threshold for the Z control system in pounds.
DIST is the maximum distance to travel during the saturate in encoder units. Encoder units are counts of feedback from the shaft encoder.
The gain numbers used for compensation in the control loops are:
Y_kp is the value for $K_p$ in the Y control loop compensator.
Y_kv is the value for $K_v$ in the Y control loop compensator.
Z_kp is the value for $K_p$ in the Z control loop compensator.
Z_kv is the value for $K_v$ in the Z control loop compensator.
Units for $K_p$ are (PWM counter)/(Encoder Unit of Position).
Units for $K_v$ are Milliseconds.
All values are times 256, for scaling purposes.
Standby
Y_kp = 110
Y_kv = 2048
Z_kp = 110
Z_kv = 1664
Translate
Y_kp = 110
Y_kv = 2048
Z_kp = 55
Z_kv = 1792
Plunge
Y_kp = 220
Y_kv = 1357
Z_kp = 110
Z_kv = 1664
Vertical movement
Y_kp = 110
Y_kv = 2048
Z_kp = 110
Z_kv = 2048

What is claimed is:

1. In a cartridge handling system having a Y control system and a Z control system for moving a transport of said cartridge handling system, said transport having an engaging mechanism for inserting a cartridge into a cell of said cartridge handling system, a method of determining a calibrated a full cell insert position of said engaging mechanism comprising the steps of:

(a) activating said Y control system and said Z control system to position said transport at a cell containing a cartridge; and (b) activating said Z control system until a predetermined force is encountered and storing a resulting Z control system location as said calibrated full cell insert position.

* * * * *